US012558875B2

(12) United States Patent　　　(10) Patent No.:　US 12,558,875 B2
Takahashi et al.　　　　　　　　　(45) Date of Patent:　　Feb. 24, 2026

(54) MILLIMETER WAVE REFLECTIVE DECORATIVE MATERIAL AND METHOD OF INSTALLING THE SAME

(71) Applicant: TOPPAN HOLDINGS INC., Tokyo (JP)

(72) Inventors: Yusuke Takahashi, Tokyo (JP); Tomohiko Sato, Tokyo (JP); Motoyuki Ogasawara, Tokyo (JP); Tadashi Takeda, Tokyo (JP); Ayano Yaguchi, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/813,257

(22) Filed: Aug. 23, 2024

(65) Prior Publication Data

US 2024/0408848 A1　　Dec. 12, 2024

Related U.S. Application Data

(63) Continuation of application No. PCT/JP2023/006802, filed on Feb. 24, 2023.

(30) Foreign Application Priority Data

Feb. 24, 2022　(JP) ................................. 2022-026470
Feb. 24, 2022　(JP) ................................. 2022-026916
(Continued)

(51) Int. Cl.
B32B 3/10　　　　　(2006.01)
B32B 5/02　　　　　(2006.01)
(Continued)

(52) U.S. Cl.
CPC .............. B32B 15/085 (2013.01); B32B 3/10 (2013.01); B32B 5/02 (2013.01); B32B 7/12 (2013.01);
(Continued)

(58) Field of Classification Search
CPC .... B32B 3/10; B32B 3/14; B32B 3/18; B32B 3/22
See application file for complete search history.

(56) References Cited

U.S. PATENT DOCUMENTS

2014/0327595 A1　11/2014　Van Oosterbosch et al.
2021/0194147 A1　6/2021　Nagano
(Continued)

FOREIGN PATENT DOCUMENTS

CN　　113519092 A　10/2021
CN　　113690627 A　11/2021
(Continued)

OTHER PUBLICATIONS

International Searching Authority, "International Search Report," issued in connection with International Patent Application No. PCT/JP2023/006802, dated May 16, 2023.
(Continued)

*Primary Examiner* — Elizabeth E Mulvaney
(74) *Attorney, Agent, or Firm* — Foley & Lardner LLP

(57) ABSTRACT

A millimeter wave reflective decorative material including a planar dielectric, and a supercell provided on a first surface of the dielectric and having a plurality of metal patterns of different shapes.

12 Claims, 5 Drawing Sheets

(30)      Foreign Application Priority Data

| | | |
|---|---|---|
| May 23, 2022 | (JP) | 2022-083769 |
| May 23, 2022 | (JP) | 2022-083774 |
| Oct. 28, 2022 | (JP) | 2022-173327 |

(51) Int. Cl.

| | |
|---|---|
| *B32B 7/12* | (2006.01) |
| *B32B 15/085* | (2006.01) |
| *B32B 15/12* | (2006.01) |
| *B32B 15/14* | (2006.01) |
| *B32B 15/20* | (2006.01) |
| *B32B 27/08* | (2006.01) |
| *B32B 27/16* | (2006.01) |
| *B32B 27/30* | (2006.01) |
| *B32B 27/32* | (2006.01) |
| *B32B 27/36* | (2006.01) |

(52) U.S. Cl.
CPC .............. *B32B 15/12* (2013.01); *B32B 15/14* (2013.01); *B32B 15/20* (2013.01); *B32B 27/08* (2013.01); *B32B 27/16* (2013.01); *B32B 27/302* (2013.01); *B32B 27/32* (2013.01); *B32B 27/322* (2013.01); *B32B 27/325* (2013.01); *B32B 27/36* (2013.01); *B32B 2255/06* (2013.01); *B32B 2255/10* (2013.01); *B32B 2255/26* (2013.01); *B32B 2260/021* (2013.01); *B32B 2260/046* (2013.01); *B32B 2307/204* (2013.01); *B32B 2307/4026* (2013.01); *B32B 2307/41* (2013.01); *B32B 2307/538* (2013.01); *B32B 2307/7246* (2013.01); *B32B 2451/00* (2013.01)

(56)      References Cited

U.S. PATENT DOCUMENTS

| | | | |
|---|---|---|---|
| 2022/0142018 | A1 | 5/2022 | Matsushita |
| 2022/0408558 | A1 | 12/2022 | Kozono et al. |
| 2023/0077482 | A1 | 3/2023 | Shahvirdi Dizaj Yekan et al. |

FOREIGN PATENT DOCUMENTS

| | | | |
|---|---|---|---|
| JP | H01-239999 | A | 9/1989 |
| JP | H05-002957 | A | 1/1993 |
| JP | H07-183842 | A | 7/1995 |
| JP | H08-084107 | A | 3/1996 |
| JP | H10-036707 | A | 2/1998 |
| JP | H10-163720 | A | 6/1998 |
| JP | H11-251784 | A | 9/1999 |
| JP | 2000-174532 | A | 6/2000 |
| JP | 2002-155478 | A | 5/2002 |
| JP | 2005-184012 | A | 7/2005 |
| JP | 2008-041687 | A | 2/2008 |
| JP | 2008-067069 | A | 3/2008 |
| JP | 2008-205447 | A | 9/2008 |
| JP | 3152883 | U | 8/2009 |
| JP | 2011-147062 | A | 7/2011 |
| JP | 2017-151115 | A | 8/2017 |
| JP | 2020-070552 | A | 5/2020 |
| JP | 2021-048465 | A | 3/2021 |
| JP | 2021-145033 | A | 9/2021 |
| JP | 2022-025624 | A | 2/2022 |
| TW | 202125535 | A | 7/2021 |
| WO | WO-2013/031539 | A1 | 3/2013 |
| WO | WO-2019/077808 | A1 | 4/2019 |
| WO | WO-2020/111159 | A1 | 6/2020 |
| WO | WO-2021/156099 | A1 | 8/2021 |

OTHER PUBLICATIONS

International Searching Authority, "Written Opinion," issued in connection with International Patent Application No. PCT/JP2023/006802, dated May 16, 2023.

Office Action issued in corresponding Japanese Patent Application No. 2022-026916 dated Dec. 12, 2023 (4 pages).

Office Action issued in corresponding Japanese Patent Application No. 2022-083769 dated Dec. 12, 2023 (4 pages).

Office Action issued in corresponding Japanese Patent Application No. 2022-173327 dated Dec. 19, 2023 (4 pages).

Evonik, "Core Material With Unrivaled Heat Resistance and Creep Compression Strength", Retrieved from the Internet: https://performance-foams.evonik.com/en/products-and-solutions/rohacell on Nov. 11, 2024.

Notice of Opposition issued in corresponding Japanese Patent Opposition No. 2024-701179 dated Jan. 16, 2025.

Y. E. I., "Dielectric Constant Table", Retrieved from the Internet: https://www.yei-jp.com/tech-infor/dielectric/dielectric02.html on Nov. 11, 2024.

Office Action issued in corresponding Japanese Patent Application No. 2024-701179 dated Jan. 16, 2025.

Notice of Opposition issued in corresponding Japanese Patent Opposition No. 2025-700007 dated Jan. 29, 2025.

Office Action issued in corresponding Taiwanese Patent Application No. 112106906 dated Jan. 12, 2026.

MILLIMETER WAVE REFLECTIVE DECORATIVE MATERIAL AND METHOD OF INSTALLING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2023/006802, filed on Feb. 24, 2023, which is based upon and claims the benefit to Japanese Patent Application Nos. 2022-026470 and 2022-026916, both filed on Feb. 24, 2022, 2022-083769 and 2022-083774, both filed on May 23, 2022, finally 2022-173327, filed on Oct. 23, 2022, the disclosures of all which are incorporated herein by reference in their entirety.

TECHNICAL FIELD

The present invention relates to a millimeter wave reflective decorative material that reflects radio waves whose frequencies are within the millimeter wave band. Reference is also made to an installation method of attaching a millimeter wave reflective decorative material to a construction material.

BACKGROUND

Background Art

The occurrence of radio wave dead zones has been a problem in putting various wireless devices compatible with millimeter waves into practical use. As compared with more commonly used VHF waves and UHF waves, millimeter-wave radio waves are very easily attenuated and have a high straightness. For these reasons, millimeter-wave radio waves do not easily undergo diffraction nor easily propagate around obstacles.

In order to eliminate dead zones for millimeter-wave radio waves, a reflector that reflects millimeter-wave radio waves (hereinafter referred to as a "millimeter wave reflector") has been proposed.

The multi-beam reflector array described in PTL 1 can function as a millimeter wave reflector. This multi-beam reflector array has a planar dielectric having a large number of reflective units that reflect millimeter waves at a predetermined angle on one surface, and a metal layer that functions as a ground on the other surface. Each reflective unit includes a plurality of metal patterns having different shapes.

A millimeter wave incident on the surface having the reflective units is reflected by both the metal patterns and the metal layer. Since the reflected waves undergo mutual interference, the millimeter wave is reflected with a phase different from that at the time of incidence.

Further, interference waves based on different metal patterns have different phases, resulting in secondary interference. This means that by appropriately setting the shapes of the plurality of metal patterns forming a reflective unit, the direction in which the incident millimeter wave is reflected can be set to a desired direction.

[Citation List] [Patent Literature] [PTL 1] WO 2013/031539 A

SUMMARY OF THE INVENTION

Technical Problem

In principle, it can be expected that dead zones can be efficiently eliminated by attaching millimeter wave reflectors to the inner or outer surfaces of buildings as decorative materials over a relatively large area.

However, in order to apply the reflector array described in PTL 1 to decorative materials, their appearance, reflection characteristics, and the like need to be improved.

If the reflect array described in PTL 1 is applied to a decorative material that is installed outdoors, good antifouling properties are required. In addition, it is also necessary to protect the metal patterns for a long period of time to prevent them from deteriorating and their reflective characteristics from significantly decreasing or disappearing.

There are also several problems in attaching the reflect array described in PTL 1 to decorative materials.

First, when applying a wall material to a wall substrate, an aqueous adhesive is generally used for reasons such as preventing sick building syndrome. Specifically, one or a combination of two or more of vinyl acetate, ethylene vinyl acetate, acrylic and other emulsions, water-soluble synthetic resin pastes such as polyvinyl alcohol, and natural vegetable pastes such as starch may be used.

As mentioned above, the millimeter wave reflector has a metal layer, and the metal layer may come into contact with the aqueous adhesive if the millimeter wave reflector is installed in this manner. As a result, the wall material may not be able to be properly bonded to the wall substrate, or the metal layer may corrode.

It is also possible to install the millimeter-wave reflector using materials other than an aqueous adhesive, such as organic solvent-based adhesives or adhesive films, but this may complicate the work because only the millimeter wave reflector would have to be installed using a different method.

An object of the present invention is to provide a millimeter wave reflective decorative material that has good antifouling properties, can maintain good reflection characteristics for a long period of time even when installed outdoors, and functions well even when installed using an aqueous adhesive.

Solution to Problem

A first aspect of the present invention is a millimeter wave reflective decorative material including a planar dielectric, and a supercell provided on a first surface of the dielectric and having a plurality of metal patterns of different shapes.

A second aspect of the present invention is the millimeter wave reflective decorative material according to the first aspect, further including a protective layer containing an olefin-based material as a main component and covering the supercell, characterized in that the protective layer obscures the supercell in plan view.

A third aspect of the present invention is the millimeter wave reflective decorative material according to the second aspect, further including an adhesive layer located between the dielectric and the protective layer, and between the supercell and the protective layer.

A fourth aspect of the present invention is the millimeter wave reflective decorative material according to the second aspect, characterized in that the olefin-based material has a dielectric constant $\varepsilon r$ of 2.7 or less.

A fifth aspect of the present invention is the millimeter wave reflective decorative material according to the second aspect, characterized in that the protective layer has a porous structure.

A sixth aspect of the present invention is the millimeter wave reflective decorative material according to the first aspect, further including an antifouling layer covering the supercell and having a surface with a pure water contact angle of 90° or more, characterized in that the antifouling layer has a dielectric constant εr of 2.9 or less, and the antifouling layer obscures the supercell in plan view.

A seventh aspect of the present invention is the millimeter wave reflective decorative material according to the sixth aspect, further including an adhesive layer located between the dielectric and the antifouling layer and between the supercell and the antifouling layer.

An eighth aspect of the present invention is the millimeter wave reflective decorative material according to the sixth aspect, characterized in that the antifouling layer contains a fluorine-based material or a silicone-based material.

A ninth aspect of the present invention is the millimeter wave reflective decorative material according to the sixth aspect, characterized in that the antifouling layer includes a substrate having a surface with a pure water contact angle of less than 90°, and a surface layer provided on the substrate and having a surface with a pure water contact angle of 90° or more.

A tenth aspect of the present invention is a millimeter wave reflective decorative material including: a planar dielectric; a supercell provided on a first surface of the dielectric and having a plurality of metal patterns of different shapes; a metal layer provided on a second surface of the dielectric opposite to the first surface; an adhesive layer covering the metal layer; and a fiber layer bonded to the adhesive layer.

An eleventh aspect of the present invention is the millimeter wave reflective decorative material according to the tenth aspect, characterized in that a thickness of the adhesive layer is larger than a maximum height Rz of a surface of the metal layer.

A twelfth aspect of the present invention is an installation method of attaching, to a construction material, a millimeter wave reflective decorative material including a planar dielectric, a supercell provided on a first surface of the dielectric and having a plurality of metal patterns of different shapes, a metal layer provided on a second surface of the dielectric opposite to the first surface, and an adhesive layer covering the metal layer, the method including: applying an aqueous adhesive to a surface of the construction material; bonding a fiber layer to the aqueous adhesive; and attaching the millimeter wave reflective decorative material to the construction material by bonding the adhesive layer to the fiber layer.

A thirteenth aspect of the present invention is a millimeter wave reflective decorative material including: a planar dielectric; a supercell provided on a first surface of the dielectric and having a plurality of metal patterns of different shapes; a metal layer provided on a second surface of the dielectric opposite to the first surface; a first adhesive layer covering the metal layer; a water vapor barrier layer provided on the first adhesive layer; a second adhesive layer provided on the water vapor barrier layer; and a fiber layer bonded to the second adhesive layer.

A fourteenth aspect of the present invention is the millimeter wave reflective decorative material according to the thirteenth aspect, characterized in that the water vapor barrier layer has a water vapor permeability of 45 g/m²/24 h or less.

A fifteenth aspect of the present invention is an installation method of attaching, to a construction material, a millimeter wave reflective decorative material including a planar dielectric, a supercell provided on a first surface of the dielectric and having a plurality of metal patterns of different shapes, a metal layer provided on a second surface of the dielectric opposite to the first surface, a first adhesive layer covering the metal layer, a water vapor barrier layer provided on the first adhesive layer, and a second adhesive layer provided on the water vapor barrier layer, the method including: applying an aqueous adhesive to a surface of the construction material; bonding a fiber layer to the aqueous adhesive; and attaching the millimeter wave reflective decorative material to the construction material by bonding the second adhesive layer to the fiber layer.

Advantageous Effects of the Invention

The millimeter wave reflective decorative material according to the present invention has good appearance and reflection characteristics. The millimeter wave reflective decorative material according to the present invention has good antifouling properties, and can maintain good reflection characteristics for a long period of time even when installed outdoors. Further, the millimeter wave reflective decorative material according to the present invention functions well even when installed with an aqueous adhesive.

BRIEF DESCRIPTION OF THE DRAWINGS

FIG. 9 is a partially enlarged plan view of the millimeter wave reflector.

DETAILED DESCRIPTION

Description of the Embodiments

First Embodiment

Figures 1, 2:
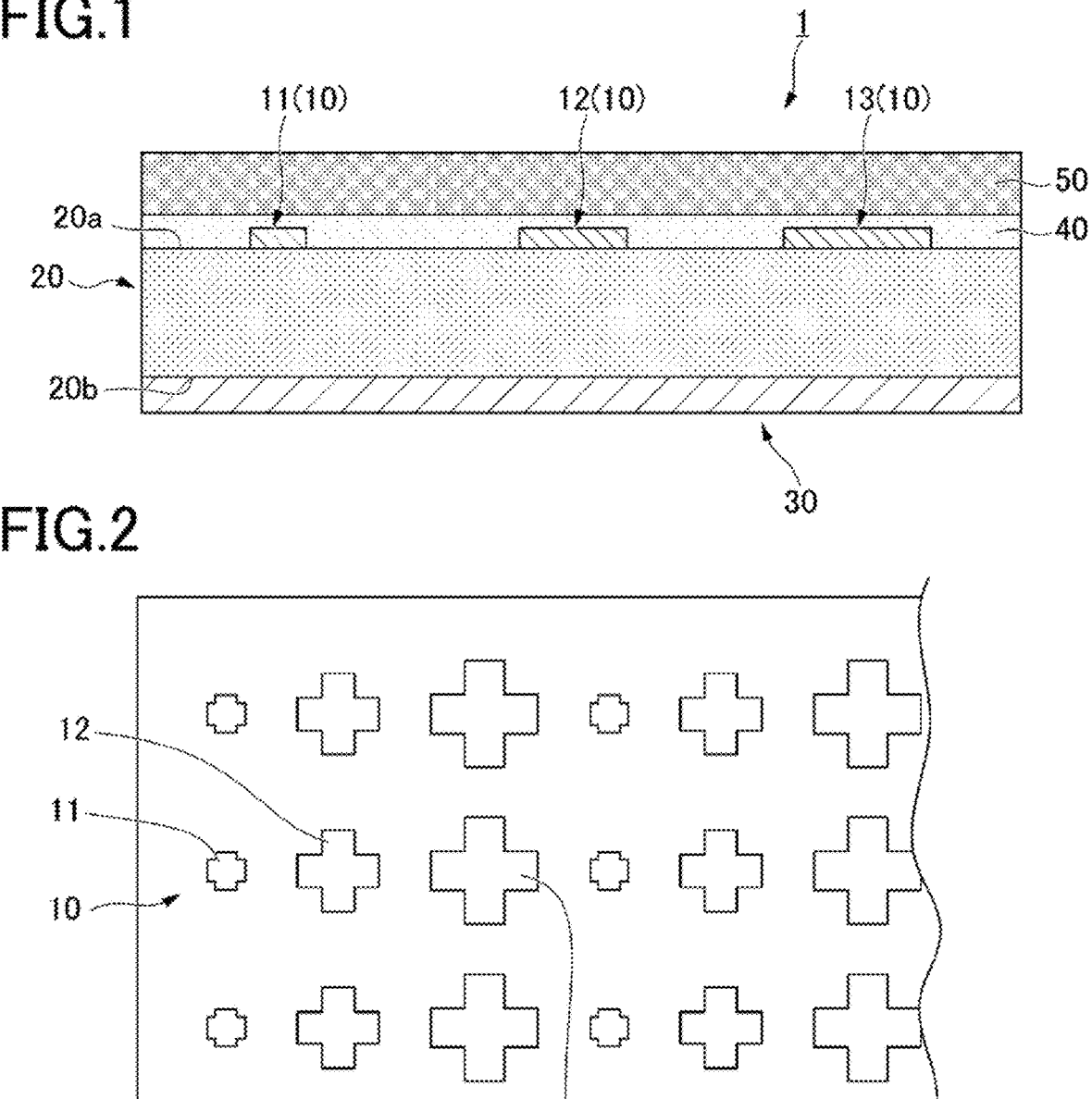
FIG. 1 is a schematic cross-sectional view of a millimeter wave reflective decorative material according to a first embodiment of the present invention.
FIG. 2 is a partially enlarged plan view of the millimeter wave reflective decorative material in which the protective layer and the adhesive layer are not shown.

Referring to FIGS. 1 and 2, a first embodiment of the present invention will be described.

FIG. 1 is a schematic cross-sectional view illustrating a millimeter wave reflective decorative material (hereinafter simply referred to as a "decorative material") 1 of the present embodiment. As shown in FIG. 1, the decorative material 1 includes a planar dielectric 20, supercells 10 and a metal layer 30 provided on the dielectric 20, an adhesive layer 40 and a protective layer 50 covering the supercells 10.

FIG. 2 shows a partially enlarged plan view of the decorative material 1 excluding the adhesive layer 40 and the protective layer 50. A plurality of supercells 10 are provided on a first surface 20a of the dielectric 20 and have a plurality of metal patterns of different shapes.

In this embodiment, the supercells 10 have three cross-shaped metal patterns 11, 12, and 13 of different sizes. The metal patterns 11, 12, and 13 are arranged in one direction side by side. The shape, number, arrangement, and the like of the metal patterns are not limited to those shown in FIG. 2 and can be set as appropriate. They may have an annular shape or a three-dimensional shape like the mushroom structure described in PTL 1.

The plurality of supercells 10 are arranged in a two-dimensional matrix along the sides of the decorative material 1, which is rectangular in plan view.

The material of the dielectric 20 is not particularly limited as long as it is a dielectric. Suitable examples of the dielectric 20 include glass cloth impregnated with synthetic resin, films made of various synthetic resins, and the like. Among these, dielectrics having low-loss electrical characteristics are more suitable, and examples include high-purity glass (quartz glass), fluororesin, liquid crystal polymers, polyphenylene ether, polyether ketone, and polyolefin. These may be used singly or by mixing or laminating a plurality of them.

The metal layer 30 is provided on a second surface 20b of the dielectric 20 opposite to the first surface 20a, and substantially covers the entire second surface 20b.

The dielectric 20, the supercells 10, and the metal layer 30 can be produced by, for example, using a material including a dielectric and metal foils bonded to both surfaces of the dielectric, and forming a plurality of supercells by patterning the metal foil by etching or the like.

In this embodiment, the supercells 10 and the metal layer 30 are made of copper. However, the materials of the supercells 10 and the metal layer 30 are not limited to copper, and they may be gold, silver, aluminum, or the like. The metal layer 30 in this embodiment only needs to have metal as its main component, and may also contain substances other than metal as long as it maintains conductivity of about $10^{-6}$ $\Omega \cdot m$ or less in terms of resistance. For example, silver-containing paste, copper-containing paste, and conductive metal oxides such as ITO can also be applied to the metal layer 30 depending on the purpose.

The protective layer 50 is made of an olefin-based material. Specific examples of the material include polyethylene, polypropylene, polystyrene, polymethylpentene, cycloolefin polymers, and cycloolefin copolymers.

Although details will be described later, the dielectric constant εr of olefin-based materials is lower than that of vinyl chloride and other materials commonly used for decorative materials. Therefore, by applying an olefin-based material to the decorative material 1, good reflective characteristics can be achieved. The specific gravity of olefin-based materials is lower than that of vinyl chloride and other materials commonly used for decorative materials. Therefore, it is possible to reduce the weight of the decorative material 1 to 2300 g or less per square meter even when it is provided with a protective layer. This is also advantageous in that the decorative material 1 can be configured to have improved ease of installation.

The material of the adhesive layer 40 is not particularly limited as long as it can bond the protective layer 50 to the dielectric 20 or the metal layer forming the supercells 10 with sufficient strength. For good bondability, an olefin-based material is preferable as with the protective layer 50. For good reflective characteristics, one with a dielectric constant εr of 2.7 or lower is preferable.

In a plan view of the decorative material 1, the supercells 10 are not visible because they are covered by the adhesive layer 40 and the protective layer 50. This maintains a good appearance. There is no particular restriction on how the supercells 10 are obscured, and, for example, this may be performed in the following ways.

At least one of the adhesive layer 40 and the protective layer 50 contains a pigment or dye to make at least one of the adhesive layer 40 and the protective layer 50 opaque.

An opaque printed layer is provided on at least one side of the protective layer 50.

A porous film having a large number of pores is used as the protective layer 50 so that light incident on the protective layer 50 is diffusely reflected.

At least one surface of the protective layer 50 is roughened by sandblasting, transfer, or the like so that light incident on the roughened surface is diffusely reflected. For example, when the surface haze of the protective layer 50 is 90% or higher, the supercells 10 can be sufficiently obscured.

These may be combined as appropriate. For example, by using a film having a porous structure as the protective layer and further providing an opaque wood-grain print layer, the decorative material 1 can be configured as a wood-grain wallpaper that is soft to the touch.

Even if the individual coloring or diffuse reflection of the adhesive layer 40 or the protective layer 50 alone is not sufficient to completely obscure the supercells 10, it suffices if the supercells 10 cannot be seen when the adhesive layer 40 and the protective layer 50 are stacked.

The operations of the decorative material 1 of the present embodiment during use, which is configured as described above, will now be explained.

The decorative material 1 can be attached to a wall surface inside or outside a building by placing a layer of a bonding material such as an adhesive or mortar on the metal layer 30. If the surface to which the decorative material 1 is made of metal, the metal layer 30 may be omitted since this metal surface functions as a metal layer.

Since the supercells 10 arranged in large numbers are obscured when the decorative material 1 is viewed from the protective layer 50 side, discomfort is not caused to the viewer. Further, since the metal patterns forming the supercells 10 are protected by the protective layer 50, damage and deterioration are suppressed, and they can be maintained in good condition for a long period of time.

When millimeter waves enter the decorative material 1 from the protective layer 50 side, the millimeter weaves travel inside the decorative material 1 through the protective layer 50 and the adhesive layer 40. Part of the millimeter waves is reflected by the supercells 10, and the other part passes through the dielectric 20 and is reflected by the metal layer 30. The incident millimeter waves are emitted from the decorative material 1 as reflected waves in accordance with reflection characteristics set by the phase difference between these reflected waves and the metal patterns of the supercells 10.

In this series of operations, the millimeter wave passes through the protective layer 50 and the adhesive layer 40 twice, namely, when it enters and when it exits as a reflected wave. Therefore, if the dielectric constants of the protective layer 50 and the adhesive layer 40 are high, the millimeter wave is attenuated greatly as it passes through the protective layer 50 and the adhesive layer 40. This means that the millimeter wave reflection characteristics decrease significantly compared to when the protective layer 50 and the adhesive layer 40 are not present.

In the decorative material 1 of this embodiment, the protective layer 50 is made of an olefin-based material. Therefore, even if the protective layer 50 contains other additives or is printed, the ratio of the olefin-based material in the protective layer 50 is 95% or more. As a result, the protective layer 50 as a whole can have a low dielectric constant, and attenuation of incident millimeter waves can be suppressed.

In this way, in the decorative material 1, the protective layer 50 provides both a good appearance and good reflection characteristics. This effect may be further enhanced by using an olefin-based material with a lower dielectric εr of 2.5 or lower as the main component of the protective layer 50, or by using a material with a lower dielectric constant as the adhesive layer 40.

When the protective layer 50 is bonded to the dielectric 20 via another layer such as an adhesive layer, it is preferable that the total dielectric constant εr of the protective layer 50 and the other layer is 2.5 or lower.

The millimeter wave reflective decorative material according to the present embodiment will be further described by using examples. The technical idea according to the present invention is not limited in any way by the specific contents of the examples.

Example I-1

A 400 mm×300 mm copper-clad laminate (CGP-500 manufactured by Chukoh Chemical Industries, Ltd.) including a dielectric and copper foils on both sides thereof was prepared. The dielectric is a fluororesin-impregnated glass cloth (thickness: 764 μm). The two copper foils both have a thickness of 18 μm, and the total thickness is 0.8 mm.

One side of the copper-clad laminate was etched to form a plurality of supercells arranged in a two-dimensional matrix. The supercells include three cruciform metal patterns. The small pattern has a width of 1.1 mm, and vertical and horizontal dimensions of 1.4 mm. The medium pattern has a width of 1.4 mm, and vertical and horizontal dimensions of 3.0 mm. The large pattern has a width of 1.4 mm, and vertical and horizontal dimensions of 3.7 mm. The three patterns were arranged in the order of small, medium, and large at equal intervals within a 5 mm×15 mm section, and this was used as a unit of supercell. This supercell is designed to reflect vertically incident 28 GHz band millimeter waves at an angle of 45° in the direction from the small pattern toward the large pattern.

The supercells having the above configuration was formed into a two-dimensional matrix of 80 rows and 20 columns.

A polyolefin-based porous film (αYUPO QJJ400, manufactured by Yupo Corporation) having a thickness of 400 μm was prepared. This porous film has an opaque white color, a specific gravity of 0.99, and a dielectric constant εr of 2.30 (a loss tangent of 0.0005) at 10 GHz. The dielectric constant and loss tangent were measured using a vector network analyzer (N5224B manufactured by Keysight Technologies) and a split cylinder resonator (CR710 manufactured by EM labs, Inc.).

On a release film, a polyolefin-based adhesive (SEPTON 2007, polystyrene-poly(ethylene-propylene)-block polystyrene, manufactured by Kuraray Co., Ltd.) was dissolved in toluene to a concentration of 25 wt %. After that, the polyolefin-based adhesive dissolved in toluene was applied onto the release film using a knife coater and dried to form a transparent adhesive layer with a thickness of 25 μm.

The specific gravity of the adhesive layer is 0.91, and the dielectric constant εr at 10 GHz is 2.20 (a loss tangent of 0.0013).

The release film with the adhesive layer was attached to the dielectric so as to cover the supercells, and only the release film was removed to provide the adhesive layer. Then, the porous film was attached to the adhesive layer, and these were heated and pressurized at 200° C. and 1 MPa for 10 seconds.

In this way, the decorative material according to Example I-1 was obtained. The weight of this decorative material per square meter was 2285 g.

In the decorative material according to Example I-1, the total specific gravity of the porous film and adhesive layer together was 0.99, and the total dielectric constant εr at 10 GHz was 2.3 (a loss tangent of 0.0005).

Example I-2

A cycloolefin polymer-based resin film (ZEONOR ZF16 manufactured by Zeon Corporation) having a thickness of 100 μm and was prepared. This resin film is transparent and has a specific gravity of 1.1 and a dielectric constant εr of 2.33 (a loss tangent of 0.00039) at 10 GHz.

An adhesive layer was placed on the same dielectric with supercells as in Example I-1, and a resin film was bonded to this assembly. The lamination of the adhesive layer and the resin film were further performed twice, and then heat and pressure were applied in the same manner as in Example I-1. The upper surface of the uppermost resin film was sandblasted using amorphous silica powder with a long side length of 30 μm. The surface layer was washed with water and dried with warm air after the treatment.

In this way, the decorative material according to Example I-2 was obtained. The weight of this decorative material per square meter was 2239 g.

The decorative material according to Example I-2 has a plurality of protective layers and a plurality of adhesive layers, and the surface haze of the protective layer is 92%.

In the decorative material according to Example I-2, the total specific gravity of the porous film and adhesive layer together was 1.1, and the total dielectric constant εr at 10 GHz was 2.3 (a loss tangent of 0.0006).

Comparative Example I-1

A vinyl chloride-based resin film with a thickness of 400 μm was prepared. This resin film has a white color, a specific gravity of 1.8, and a dielectric constant εr of 3.00 (a loss tangent of 0.020) at 10 GHz.

On the release film, a vinyl chloride-vinyl acetate copolymer adhesive (SOLBIN CN manufactured by Nissin Chemical Industry Co., Ltd.) was dissolved to 25 wt % in a mixture solvent of methyl ethyl ketone and toluene mixed at a mass ratio of 1:1. After that, the vinyl chloride-vinyl acetate copolymer adhesive dissolved in the mixture solvent was applied onto the release film using a knife coater and dried to form a transparent adhesive layer with a thickness of m.

The specific gravity of the adhesive layer according to Comparative Example I-1 is 1.32, and the dielectric constant εr at 10 GHz is 3.29 (a loss tangent of 0.025).

Using these, the decorative material according to Comparative Example I-1 was obtained in the same manner as in Example I-1. The weight of this decorative material per square meter was 2633 g.

In the decorative material according to Comparative Example I-1, the total specific gravity of the porous film and adhesive layer together was 1.7, and the total dielectric constant εr at 10 GHz was 3.0 (a loss tangent of 0.0206).

Comparative Example I-2

The decorative material according to Comparative Example 2 was obtained in the same manner as in Example I-1, except that the adhesive layer and the protective layer were not attached. The weight of this decorative material per square meter was 1868 g.

The millimeter-wave reflective decorative materials of these examples were evaluated as follows.

(Appearance Evaluation)

The decorative material of each example was attached to a steel partition using an acrylic adhesive. Ten testers visually observed the decorative material of each example to evaluate whether it makes them feel uncomfortable as a decorative sheet or wall material. The sample was rated as "passed" when six or more testers did not feel uncomfortable, and rated as "failed" when five or fewer testers did not feel uncomfortable.

(Evaluation of Supercell Protection Performance)

The decorative material of each example was left standing in an environment of 65° C. and 65% RH (relative humidity) for 100 hours. The protection layer and adhesive layer were removed from the decorative material of each example after being left to stand to observe each metal pattern of the supercells and determine whether there was rust or discoloration.

(Reflection Characteristics Evaluation)

The decorative material of each example was attached to a flat wooden board so that the metal layer of the decorative material of each example was in contact therewith, and the decorative material of each example attached to the wooden board was fixed in an anechoic chamber environment.

Transmitted waves from a horn antenna were reflected by a curved reflector to generate 28 GHz plane waves and perpendicularly irradiate the decorative material with the plane waves.

The reflected wave from the decorative material was measured using a receiving antenna installed in a far-field position relative to the decorative material. This receiving antenna was installed on the robot and is configured to orbit while maintaining a constant far-field distance from the decorative material (that is, to orbit while maintaining a constant distance between the receiving antenna and the decorative material) so that the reflected waves could be measured over a wide angular range. In this evaluation, the RCS (radar cross section) in a direction of 45° to the normal, which is the design content, was used as the evaluation value.

In the appearance evaluation, the supercells were no longer visible in all of Examples I-1, I-2, and Comparative Example I-1 because of the protective layer having a white appearance. Therefore, Examples I-1, I-2, and Comparative Example I-1 were rated as a pass. As for Comparative Example I-2, many testers felt uncomfortable because the supercells were exposed. Therefore, Comparative Example I-2 were rated as a fail.

Regarding the evaluation of supercell protection performance, no discoloration or rust was seen on the supercells in all of Examples I-1, I-2, and Comparative Example I-1, and the supercells were well protected. In Comparative Example I-2, rust had formed on the metal patterns, and deterioration of the supercells was observed.

The results of the reflection characteristics evaluation were as follows.

Example I-1 −0.29 dBsm (decibel square meter), reflectance 82%

Example I-2 −1.07 dBsm, reflectance 78%

Comparative Example I-1 −1.87 dBsm, reflectance 65%

Comparative Example I-2 −0.27 dBsm, reflectance 94%

Examples I-1 and I-2 exhibited good reflection characteristics despite their supercells being covered with the protective layer. On the other hand, Comparative Example I-1 having a protective layer made of vinyl chloride showed a loss in reflection (ability to reflect millimeter waves).

The above measured values for Comparative Example I-2 were obtained immediately after fabrication. When these reflection characteristics of the decorative material of Comparative Example I-2 were measured after evaluating the supercell protection performance, they were unmeasurable as the decorative material had lost the ability to reflect millimeter waves.

The above results show that the decorative materials according to the examples had good appearance and reflection characteristics. It can also be expected that the protective layer will maintain the good reflection characteristics for a long period of time.

While an embodiment and examples of the present invention have been described, the specific configurations are not limited to the above embodiment. Various modifications and combinations of the configurations can be made without departing from the gist of the present invention. Some examples of modifications will be described. However, possible modifications are not limited to these, and other modifications may be made. These modifications can be combined as desired.

In the millimeter wave reflector according to the present invention, the metal layer does not necessarily have to be provided on the second surface without any gaps. For example, the metal layer may be in the form of a mesh with small openings, or may have linear spaces corresponding to the sections of supercells. However, in areas where there is no metal layer, incident millimeter waves are transmitted without being reflected, so if there are too many areas where there is no metal layer, the reflection performance may be affected. Therefore, it is preferable that the maximum continuous length of an area with no metal layer is smaller than ¼λ of the frequency of the wave to be reflected. When the metal layer is in the form of a mesh, it is possible to transmit radio waves of predetermined wavelengths without reflecting them by adjusting the dimensions of the openings.

The decorative material may be configured such that an adhesive layer and a separator are provided on the metal layer, and the separator is peeled off to attach the decorative material directly to a wall surface or the like.

The arrangement of the supercells on the dielectric is not limited to the above-described arrangement and can be set as appropriate.

The adhesive layer is not essential in the present invention. For example, the protective layer may be fixed to the dielectric using screws or the like, or part of the dielectric or the protective layer may be melted and bonded using high frequency waves, ultrasonic waves, a laser, or the like. in the case an adhesive layer is provided, it is not limited to an ordinary adhesive, and methods such as thermal fusion using a hot melt adhesive or a heat seal layer can also be applied.

Second Embodiment

Figure 3:
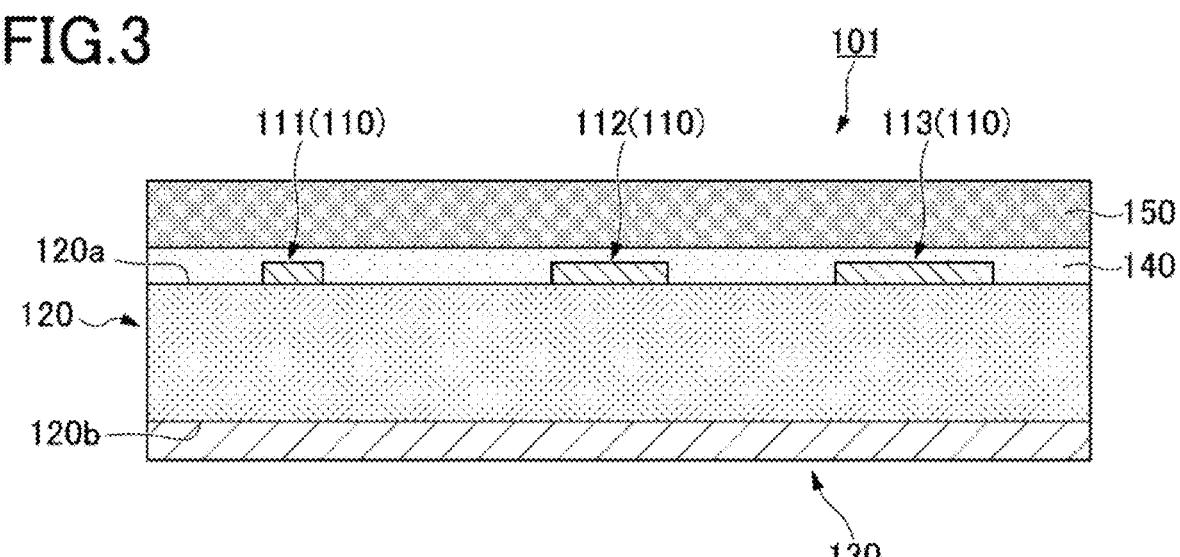
FIG. 3 is a schematic cross-sectional view of a millimeter wave reflective decorative material according to a second embodiment of the present invention.
Figure 4:
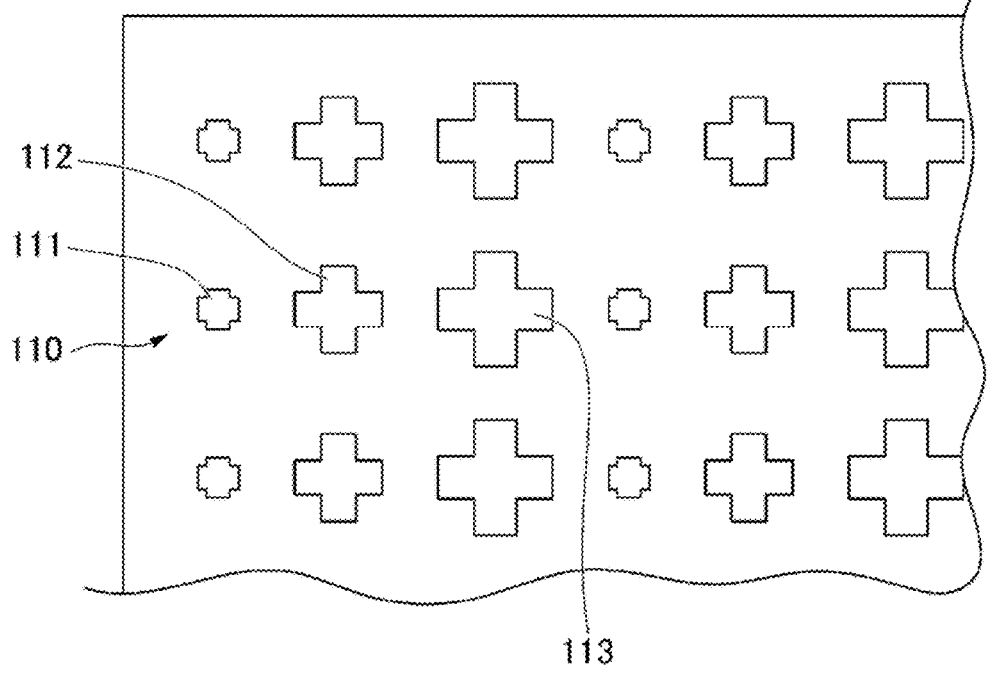
FIG. 4 is a partially enlarged plan view of the millimeter wave reflective decorative material in which the antifouling layer and the adhesive layer are not shown.

Referring to FIGS. 3 and 4, a second embodiment of the present invention will be described.

FIG. 3 is a schematic cross-sectional view illustrating a millimeter wave reflective decorative material (hereinafter simply referred to as a "decorative material") 101 of the present embodiment. As shown in FIG. 3, the decorative material 101 includes a planar dielectric 120, supercells 110 and a metal layer 130 provided on the dielectric 120, and an adhesive layer 140 and an antifouling layer 150 covering the supercells 110.

FIG. 4 shows a partially enlarged plan view of the decorative material 101 excluding the adhesive layer 140 and the antifouling layer 150. A plurality of supercells 110 are provided on a first surface 120a of the dielectric 120 and have a plurality of metal patterns of different shapes.

In this embodiment, the supercells 110 have three cruciform metal patterns 111, 112, and 113 of different sizes. The metal patterns 111, 112, and 113 are arranged in one direction side by side. The shape, number, arrangement, and the like of the metal patterns are not limited to those shown in FIG. 4, and can be set as appropriate. They may have an annular shape or a three-dimensional shape like the mushroom structure described in PTL 1.

The plurality of supercells 110 are arranged in a two-dimensional matrix along the sides of the decorative material 101, which is rectangular in plan view.

The material of the dielectric 120 is not particularly limited as long as it is a dielectric. Suitable examples of the dielectric 120 include glass cloth impregnated with synthetic resin, films made of various synthetic resins, and the like. Among these, dielectrics having low-loss electrical characteristics are more suitable, and examples include high-purity glass (quartz glass), fluororesin, liquid crystal polymers, polyphenylene ether, polyether ketone, and polyolefin. These may be used singly or by mixing or laminating a plurality of them.

The metal layer 130 is provided on a second surface 120b of the dielectric 120 opposite to the first surface 120a, and substantially covers the entire second surface 120b.

The dielectric 120, the supercells 110, and the metal layer 130 can be produced by, for example, using a material including a dielectric and metal foils bonded to both surfaces of the dielectric, and forming a plurality of supercells by patterning the metal foil by etching or the like.

In this embodiment, the supercells 110 and the metal layer 130 are made of copper. However, the materials of the supercells 110 and the metal layer 130 are not limited to copper, and they may be gold, silver, aluminum, or the like. The metal layer 130 in this embodiment only needs to have metal as its main component, and may also contain substances other than metal as long as it maintains conductivity of about $10^{-6}$ Ω·m or lower in terms of resistance. For example, silver-containing paste, copper-containing paste, and conductive metal oxides such as ITO can also be applied to the metal layer 130 depending on the purpose.

The antifouling layer 150 of this embodiment is made of a fluorine-based material. Specific examples of the material include polytetrafluoroethylene (PTFE) and ethylenetetrafluoroethylene (ETFE).

The material of the adhesive layer 140 is not particularly limited as long as it can bond the dielectric and the antifouling layer with sufficient strength. In terms of bondability, a material of the same type as the material of the antifouling layer is preferable.

The operations of the decorative material 101 of the present embodiment during use, which is configured as described above, will now be explained. The decorative material 101 can be attached to a wall surface inside or outside a building by placing a layer of a bonding material such as an adhesive or mortar on the metal layer 130.

Since the antifouling layer 150 is made of a fluorine-based material, its surface has a pure water contact angle of 90° or higher, and thus has good water repellency. Dirt does not easily stick to the surface, and can be easily removed by wiping even if it does. The antifouling layer 150 also advantageously suppresses deterioration of the metal patterns 111, 112, and 113 of the supercells 110 including rust and discoloration by preventing them from being exposed to the atmosphere.

As a result, the decorative material 101 is resistant to contamination even when it is placed outdoors for a long period of time, and the reflective performance of the supercells 110 is advantageously maintained for a long period of time. This facilitates maintenance and reduces the frequency of replacement.

When millimeter waves enter the decorative material 101 from the antifouling layer 150 side, the millimeter waves travel inside the decorative material 101 through the antifouling layer 150 and the adhesive layer 140. Part of the millimeter waves are reflected by the supercells 110, and the other part passes through the dielectric 120 and is reflected by the metal layer 130. The incident millimeter waves are emitted from the decorative material 101 as reflected waves in accordance with reflection characteristics set by the phase difference between these reflected waves and the metal patterns of the supercells 110.

In this series of operations, the millimeter wave passes through the antifouling layer 150 and the adhesive layer 140 twice, namely, when it enters and when it exits as a reflected wave. Therefore, if the dielectric constants of the antifouling layer 150 and the adhesive layer 140 are high, the millimeter wave is attenuated greatly as it passes through the antifouling layer 150 and the adhesive layer 140. This means that the millimeter wave reflection characteristics decrease significantly compared to when the antifouling layer 150 and the adhesive layer 140 are not present.

The antifouling layer 150 of the decorative material 101 shown in FIG. 3 is made of a fluorine-based material. Therefore, even if the antifouling layer 150 contains other additives or is printed, the ratio of the fluorine-based material in the antifouling layer 150 is 95% or higher. As a result, the antifouling layer 150 as a whole can have a low dielectric constant εr of 2.9 or lower. The resin layer can have a relatively low dielectric constant so that the attenuation of incident millimeter waves can be suppressed. This effect may be further enhanced by using a fluorine-based material with a lower dielectric εr of 2.3 or lower as the main component of the antifouling layer 150, or by also using a material with a lower dielectric constant as the adhesive layer 140. When the antifouling layer 150 is bonded to the dielectric 120 via another layer such as the adhesive layer 140 as in the decorative material 101, it is preferable that the total dielectric constant Fr of the antifouling layer 150 and the other layer is 2.9 or lower.

In a plan view of the decorative material 101, the adhesive layer 140 and the antifouling layer 150 cover the supercells 110. By configuring the adhesive layer 140 and the antifouling layer 150 in certain ways, the supercells 110 can be obscured to improve the appearance. There is no particular restriction on how the supercells 110 are obscured, and, for example, this may be done in the following ways.

At least one of the adhesive layer 140 and the antifouling layer 150 contains a pigment or dye to make at least one of the adhesive layer 140 and the antifouling layer 150 opaque.

An opaque printed layer is provided on at least one side of the antifouling layer 150.

A porous film having a large number of pores is used as the antifouling layer 150 so that incident light on the antifouling layer 150 is diffusely reflected.

At least one surface of the antifouling layer 150 is roughened by sandblasting, transfer, or the like so that incident light on the roughened surface is diffusely reflected. For example, when the surface haze of the antifouling layer 150 is 70% or more, the supercells 110 can be sufficiently obscured.

These may be combined as appropriate. For example, by using a film having a porous structure as the antifouling layer 150 and further providing an opaque wood-grain print layer, the decorative material 101 can be configured as a wood-grain wallpaper that is soft to the touch.

Even if the coloring or diffuse reflection of the adhesive layer 140 or the antifouling layer 150 alone is not sufficient to completely obscure the supercells, it suffices if the supercells cannot be seen when the adhesive layer 140 and the antifouling layer 150 are stacked.

Needless to say, if the adhesive layer 140 or the antifouling layer 150 is already opaque, it can be used as it is.

The antifouling layer 150 according to this embodiment does not need to be made of a fluorine-based material.

Figures 5, 6:
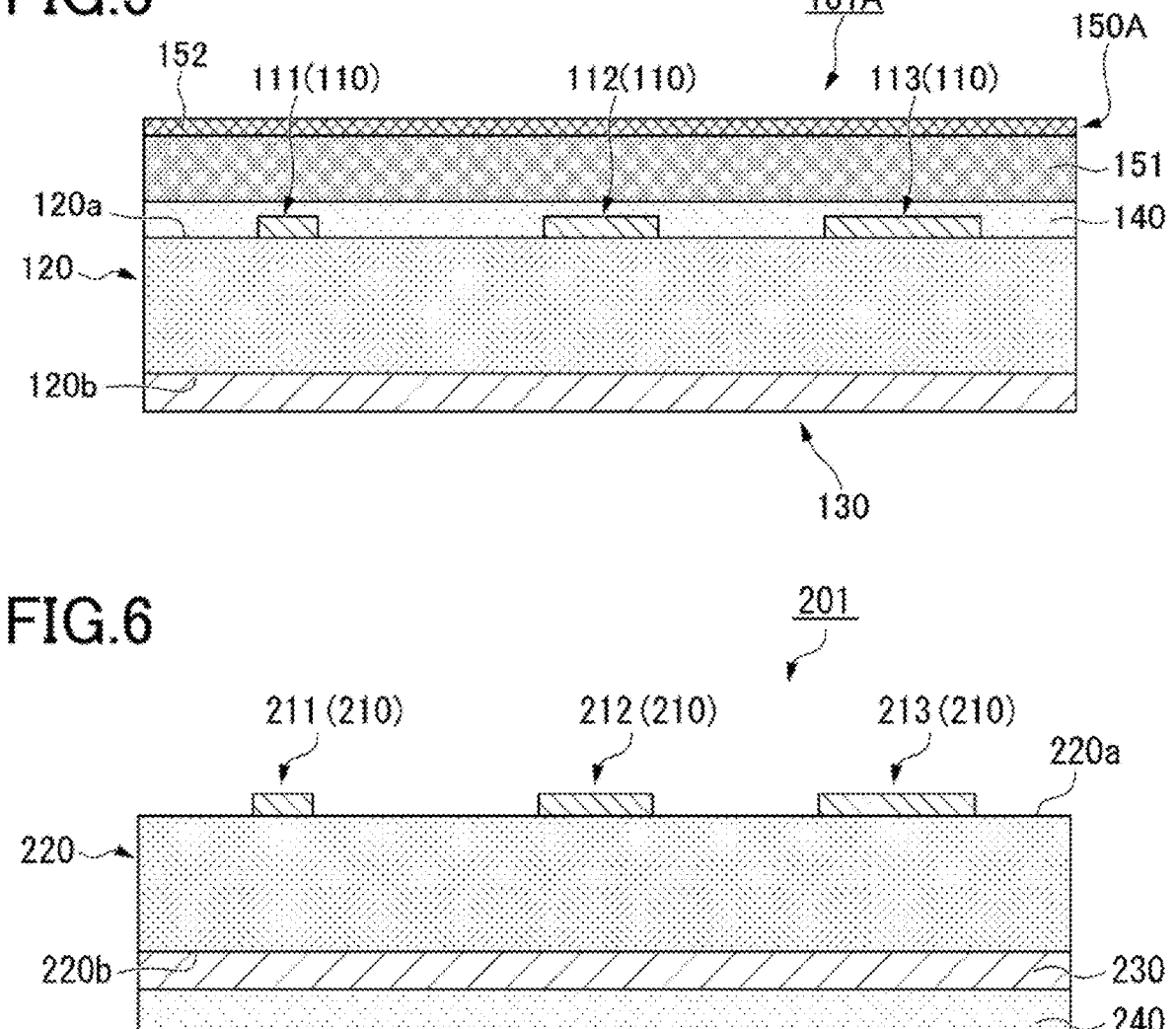
FIG. 5 is a schematic cross-sectional view of a millimeter wave reflective decorative material according to a modification of the present invention.
FIG. 6 is a schematic cross-sectional view of a millimeter wave reflector (millimeter wave reflective decorative material) according to a third embodiment of the present invention.

The antifouling layer 150A of a decorative material 101A according to a modification shown in FIG. 5 includes a substrate 151 and a surface layer 152 provided on the substrate 151. In the antifouling layer 150A, even if the pure water contact angle of the substrate 151 itself is lower than 90°, the pure water contact angle of the surface layer 152 is 90° or higher. This provides substantially the same effect as the decorative material 101 in which the antifouling layer 150A is made of a fluorine-based material.

Examples of the substrate 151 include polyester-based materials including polyethylene terephthalate (PET), polybutylene terephthalate (PBT), and polyethylene naphthalate (PEN), and olefin-based materials including polyethylene, polypropylene, polystyrene, cycloolefin polymers, and cycloolefin copolymers.

An example of the surface layer 152 is a layer made of an antifouling coating containing an antifouling agent. Such a layer can be formed by applying and drying a coating, optionally in combination with irradiation of ultraviolet light. The layer thickness can be of the order of submicrons. In that case, the material can be selected from a wide range of materials because it hardly affects the dielectric constant of the antifouling layer 150A.

The antifouling coating may be prepared by mixing a fluorine-containing antifouling agent with a binder resin. Examples of the fluorine-containing antifouling agent include fluorine-based antifouling agents and fluorosilicone antifouling agents. The binder resin may be a polymer of a polymerizable compound having at least one polymerizable functional group. Examples of the polymerizable functional group include an (meth)acryloyl group, vinyl group, allyl group, hydrosilyl group, silanol group, and epoxy group. Polyfunctional (meth)acrylate is especially preferable as the binder resin.

The millimeter wave reflective decorative material according to the present embodiment will be further described by using examples. The technical idea according to the present invention is not limited in any way by the specific contents of the examples.

Example II-1

A 400 mm×300 mm copper-clad laminate (CGP-500 manufactured by Chukoh Chemical Industries, Ltd.) including a dielectric and copper foils on both sides thereof was prepared. The dielectric is a fluororesin-impregnated glass cloth (thickness: 764 μm). The two copper foils both have a thickness of 18 μm, and the total thickness is 0.8 mm.

One side of the copper-clad laminate was etched to form a plurality of supercells arranged in a two-dimensional matrix. The supercells include three cruciform metal patterns. The small pattern has a width of 1.1 mm, and vertical and horizontal dimensions of 1.4 mm. The medium pattern has a width of 1.4 mm, and vertical and horizontal dimensions of 3.0 mm. The large pattern has a width of 1.4 mm, and vertical and horizontal dimensions of 3.7 mm. The three patterns were arranged in the order of small, medium, and large at equal intervals within a 5 mm×15 mm section, and this was used as a unit of supercell. This supercell is designed to reflect vertically incident 28 GHz band millimeter waves at an angle of 45° in the direction from the small pattern toward the large pattern.

The supercells having the above configuration was formed into a two-dimensional matrix of 80 rows and 20 columns.

A PTFE-based film (NITOFLON 900 UL, manufactured by Nitto Denko Corporation) having a thickness of 180 μm was prepared. This film has an opaque white color and a dielectric constant εr of 2.1 (a loss tangent of 0.0005) at 10 GHz. The dielectric constant and loss tangent were measured using a vector network analyzer (N5224B manufactured by Keysight Technologies) and a split cylinder resonator (CR710 manufactured by EM labs, Inc.).

Corona treatment was applied to one side of the film to improve bondability.

By using an extruder to form a film of a fluorine-based adhesive (LM-ETFEAH-2000 maleic anhydride-modified ETFE manufactured by AGC Inc.) with a thickness of 15 μm was formed on a release film, a white adhesive layer was formed.

The dielectric constant εr of the adhesive layer at 10 GHz is 2.1 (a loss tangent of 0.0012).

The release film with the adhesive layer was attached to the dielectric so as to cover the supercells, and only the release film was removed to provide the adhesive layer. Then, the PTFE film was attached to the adhesive layer with the corona-treated surface facing the adhesive layer. These were heated and pressurized at 240° C. and 5 MPa for 30 seconds.

In this way, the decorative material according to Example II-1 was obtained.

In the decorative material according to Example II-1, the total dielectric constant εr of the PTFE film and the adhesive layer together was 2.1 (a loss tangent of 0.0006).

Example II-2

An ETFE-based film (Aflex 200N NT, manufactured by AGC Inc.) having a thickness of 200 μm was prepared. This resin film was transparent and had a dielectric constant εr of 2.1 (a loss tangent of 0.0006) at 10 GHz.

Corona treatment was applied to one side of the film to improve bondability.

An adhesive layer was placed on a dielectric having supercells that is the same as that of Example II-1. An ETFE film was bonded to the adhesive layer with the corona-treated surface of the ETFE film facing the adhesive layer, and heat and pressure were applied in the same manner as in Example II-1. Further, the top surface of the ETFE film was sandblasted using amorphous silica powder with a long side length of 30 μm, and after the treatment, the surface layer was washed with water and dried with warm air.

In this way, the decorative material according to Example II-2 was obtained. The surface haze of this decorative material was 92%. In the decorative material according to Example II-2, the total dielectric constant εr of the ETFE film and the adhesive layer together was 2.1 (a loss tangent of 0.0006).

Example II-3

Examples II-3 and II-4 have antifouling layers having the configuration shown in FIG. 5.

A polypropylene-based porous film (New YUPO FGS, manufactured by Yupo Corporation) having a thickness of 200 μm was prepared as the substrate. This resin film is opaque and has a white color due to its porous structure, and has a dielectric constant εr of 2.3 (a loss tangent of 0.0006) at 10 GHz.

Corona treatment was applied to one side of the film to improve bondability.

An antifouling coating having the following composition was prepared.

Pentaerythritol triacrylate (A-TMM-3 manufactured by SHIN-NAKAMURA CHEMICAL Co., Ltd.): 100 parts by mass Silicone-based lubricant (BYK-333 manufactured by BYK Japan KK): 0.1 parts by mass Fluorine-containing antifouling agent (MEGAFACE RS-56 manufactured by DIC corporation): 0.1 parts by weight Polymerization initiator (IRGACURE 184 manufactured by BASF corporation (formerly known as Ciba Japan K.K.)): 0.1 parts by weight The above materials were diluted and mixed with methyl isobutyl ketone as a solvent so that the solid content was 5 wt % to prepare the antifouling coating.

The antifouling coating was applied to the surface of the substrate that had not been subjected to corona treatment using a bar coater, and dried in an oven (80° C. for 60 seconds). After drying, the dried coating was irradiated with ultraviolet light using an ultraviolet light applicator (light source H-Bulb, Fusion UV Systems Japan K.K.) in a nitrogen atmosphere and with an exposure of 300 mJ/m² to form a surface layer having a film thickness of about 0.05 μm. As a result, the antifouling layer according to Example II-3 having the substrate and the surface layer was obtained. The dielectric constant of this antifouling layer was 2.3 (a loss tangent of 0.0006).

On a release film, a polyolefin-based adhesive (SEPTON 4044, styrene-ethylene-ethylene-propylene-styrene (SEEPS); random copolymer block, manufactured by Kuraray Co., Ltd.) was dissolved in toluene to a concentration of 25 wt %. After that, the polyolefin-based adhesive dissolved in toluene was applied onto the release film using a knife coater and dried to form a transparent adhesive layer with a thickness of 15 μm.

The dielectric constant εr of the adhesive layer at 10 GHz is 2.20 (a loss tangent of 0.0013). This adhesive layer was placed on a dielectric having supercells that was the same as that of Example II-1. The antifouling layer was bonded to the adhesive layer with the corona-treated surface of the antifouling layer facing the adhesive layer, and heat and pressure were applied at 200° C. and 1 MPa for 10 seconds.

In this way, the decorative material according to Example II-3 was obtained.

In the decorative material according to Example II-3, the total dielectric constant εr of the antifouling layer and the adhesive layer together was 2.3 (a loss tangent of 0.0006).

Example II-4

A 125 μm thick PET film (COSMOSHINE A4300 manufactured by Toyobo Co., Ltd.) was prepared as the substrate. This resin film is transparent and has a dielectric constant εr of 2.8 (a loss tangent of 0.0080) at 10 GHz.

The antifouling coating according to Example II-4 was prepared by changing the polymerization initiator in the antifouling coating according to Example II-3 to IRGA-CURE 907 manufactured by IGM, and changing the solid content to 50%.

An A3-size aluminum plate having a thickness of 2 mm was subjected to sandblasting to roughen the entire surface of the aluminum plate and obtain a blast mold.

The antifouling coating was applied to the substrate using a bar coater and dried in an oven (80° C. for 60 seconds). After drying, the blast mold was pressed against the uncured coating film, and the coating film was cured by irradiation with ultraviolet light from the back side of the substrate under the same conditions as in Example II-3. The mold was removed after the curing to form a surface layer having a thickness of about 1.5 μm. The antifouling layer according to Example II-4 having a substrate and a surface layer was thus obtained. The surface layer had a surface haze of 70% and a whitish appearance. The dielectric constant of this antifouling layer was 2.8 (a loss tangent of 0.0081).

This antifouling layer was bonded to a dielectric with supercells using the same adhesive layer as that of Example II-3 to obtain the decorative material according to Example II-4.

In the decorative material according to Example II-4, the total dielectric constant εr of the antifouling layer and the adhesive layer together was 2.7 (a loss tangent of 0.0074).

Comparative Example II-1

A vinyl chloride-based resin film with a thickness of 200 μm was prepared. This resin film had a white color and a dielectric constant εr of 3.0 (a loss tangent of 0.020) at 10 GHz.

On the release film, a vinyl chloride-vinyl acetate copolymer adhesive (SOLBIN CN manufactured by Nissin Chemical Industry Co., Ltd.) was dissolved to 10 wt % in a mixture solvent of methyl ethyl ketone and toluene mixed at a mass ratio of 1:1. This was applied onto the release film using a knife coater and dried to form a transparent adhesive layer with a thickness of 25 μm.

The dielectric constant εr of the adhesive layer according to Comparative Example II-1 at 10 GHz is 3.29 (a loss tangent of 0.025).

After placing this adhesive layer on a dielectric having supercells that is the same as that of Example II-1, the resin film was bonded to the adhesive layer, and heat and pressure were applied at 120° C. and 2 MPa for 10 seconds. In this way, the decorative material according to Comparative Example II-1 was obtained.

In the decorative material according to Comparative Example II-1, the total dielectric constant εr of the resin film and the adhesive layer together was 3.0 (a loss tangent of 0.021).

Comparative Example II-2

The decorative material according to Comparative Example II-2 was obtained in the same manner as in Example II-3, except that the surface layer was not provided.

Comparative Example II-3

The decorative material according to Comparative Example II-3 was obtained in the same manner as in Example II-1, except that the adhesive layer and the anti-fouling layer were not attached.

The millimeter-wave reflective decorative materials of these examples were evaluated as follows.

(Appearance Evaluation)

The decorative material of each example was attached to a steel partition using an acrylic adhesive. Ten testers visually observed the decorative material of each example to evaluate whether it makes them feel uncomfortable as a decorative sheet or wall material. The sample was rated as "passed" when six or more testers did not feel uncomfortable, and rated as "failed" when five or fewer testers did not feel uncomfortable.

(Evaluation of Supercell Protection Performance)

The decorative material of each example was left standing in an environment of 65° C. and 65% RH (relative humidity) for 100 hours. The antifouling layer and adhesive layer were removed from the decorative material of each example after being left to stand to observe each metal pattern of the supercells and determine whether there was rust or discoloration.

(Evaluation of Pure Water Contact Angle)

In accordance with JIS R 3257, 4 μL of pure water was dropped onto the surface of the antifouling layer, and the contact angle was measured using a contact angle meter (manufactured by Kyowa Interface Science Co., Ltd.).

18

Contaminant A: 4% aqueous solution of Nescafe Gold Blend (manufactured by Nestle)

Contaminant B: Thick-bodied red Sakura crayon (manufactured by SAKURA COLOR PRODUCTS CORPORATION)

2. Wiping Method

Contaminant A: Moisten a cloth with water and carefully wipe off the contaminant.

Contaminant B: After carefully wiping off the contaminant with a cloth dampened with undiluted kitchen detergent, further wipe it off with water and then with a dry cloth.

3. Rating

Grade 5: No contaminant remains

Grade 4: Almost no contaminant remains

Grade 3: Contaminant remains to some degree

Grade 2: Contaminant remains, considerably noticeable

Grade 1: Large amount of contaminant remains

Samples of grade 4 or higher were rated as passed, and samples of grade 3 or lower were rated as failed.

(Reflection Characteristics Evaluation)

The decorative material of each example was attached to a flat wooden board so that the metal layer 130 of the decorative material of each example was in contact therewith, and the decorative material of each example attached to the flat wooden board was fixed in an anechoic chamber environment.

Transmitted waves from a horn antenna were reflected by a curved reflector to generate 28 GHz plane waves and perpendicularly irradiate the decorative material with the plane waves.

The reflected wave from the decorative material was measured using a receiving antenna installed in a far-field position relative to the decorative material. This receiving antenna was installed on the robot and is configured to orbit while maintaining a constant far-field distance from the decorative material (that is, to orbit while maintaining a constant distance between the receiving antenna and the decorative material) so that the reflected waves could be measured over a wide angular range. In this evaluation, the RCS (radar cross section) in a direction of 45° to the normal, which is the design content, was used as the evaluation value.

The results are shown in Table 1.

TABLE 1

| Appearance | Passed | Passed | Passed | Passed | Passed | Passed | Failed |
|---|---|---|---|---|---|---|---|
| Supercell protection performance | No rust or the like | No rust or the like | No rust or the like | No rust or the like | No rust or the like | No rust or the like | Rust was observed |
| Pure water contact angle | 114° | 93° | 90° | 102° | 68° | 75° | — |
| Wipeability | Grade 5 | Grade 5 | Grade 5 | Grade 5 | Grade 2 | Grade 3 | — |
| Reflection characteristics (dBsm) | −0.84 dBsm | −0.80 dBsm | −0.88 dBsm | −1.60 dBsm | −2.1 dBsm | −1.07 dBsm | — |
| Reflectance (%) | 82% | 83% | 82% | 69% | 62% | 78% | — |

(Wipeability Evaluation)

In accordance with the "Regulations regarding the performance indication of surface enhancing products" established by the Decorative Material Subcommittee of the Japan Vinyl Goods Manufacturer's Association, the resistance to contamination of the coated surface caused by adhesion of a contaminant and wiping was visually assessed using the following criteria.

1. Preparation of Contaminants

In the appearance evaluation, the supercells were no longer visible in all of Examples II-1 to II-4 and Comparative Examples II-1 and II-2 because of the antifouling layer having a white appearance. Therefore, Examples II-1 to II-4 and Comparative Examples II-1 and II-2 passed. As for Comparative Example II-3, many testers felt a sense of discomfort because the supercells were exposed. Therefore, Comparative Example II-3 was rated as a fail.

Regarding the evaluation of supercell protection performance, no discoloration or rust was seen on the supercells in all of Examples II-1 to II-4 and Comparative Examples II-1 and II-2, and the supercells were well protected. In Comparative Example II-3, rust had formed on the metal patterns, and deterioration of the supercells was observed.

In all of Examples II-1 to II-4, the surface of the antifouling layer showed a pure water contact angle of 90° or more. In accordance with this, it was confirmed that they had good contamination wipeability and were resistant to contamination, and that contamination attached thereto could be easily removed.

As for Comparative Examples II-1 and II-2, the pure water contact angle was lower than 90°, and the contamination wipeability was not sufficient.

The pure water contact angle could not be measured for Comparative Example II-3 since the surface of the dielectric was irregular. The wipeability was also not able to be evaluated because the contamination on the supercells and the dielectric could not be wiped off.

All of Examples II-1 to II-4 showed good reflectivity of approximately 70% or higher. On the other hand, Comparative Example II-1 showed significantly degraded reflection characteristics due to the high dielectric constant of vinyl chloride.

Comparative Example II-3 showed good reflection characteristics immediately after its fabrication. However, when these reflection characteristics of Comparative Example II-3 were measured after evaluating the supercell protection performance, they were unmeasurable as the sample had lost the ability to reflect millimeter waves.

The above results indicate that the decorative materials according to the examples have good antifouling properties and can be expected to maintain good reflection characteristics for a long period of time even when they are installed outdoors.

If living organisms form structures on the reflective surface of an installed decorative material, its reflection characteristics may be impaired even though the reflective surface is clean. Examples of such structures include spider webs and the foam of froghoppers. Considering the size and frequency the structure is formed, the influence of spider webs is particularly large and imposes a problem not only outdoors but also indoors.

The inventors have discovered that spider nesting can be effectively suppressed by containing a specific material in the antifouling layer. This will be explained using examples and comparative examples.

Example II-A

Using a 60 mm×60 mm copper-clad laminate (CGP-500), supercells similar to those of Example II-1 were formed on one side thereof in 4 columns and 12 rows.

An antifouling layer forming ink a having the composition shown below was applied to a 125 μm thick PET film (COSMOSHINE A4360 manufactured by Toyobo Co., Ltd.) so that the film thickness after drying was 13 μm. The PET film with the antifouling layer forming ink a applied thereon was dried in a drying oven at 80° C. for 1 minute.

(Antifouling Layer Forming Ink a)
　Pentaerythritol triacrylate: 60 parts by weight
　Reaction product of hexamethylene diisocyanate and pentaerythritol triacrylate: 40 parts by weight
　IRGACURE 369E: 0.2 parts by weight
　Silicone-based material (silicone leveling agent GL-02R manufactured by Kyoeisha Chemical Co., Ltd.): 2 parts by weight Styrenic fine particles (XX367K manufactured by Sekisui Chemical Co., Ltd.) 100 parts by weight
　Methyl ethyl ketone (MBK): 100 parts by weight An A3-size aluminum plate having a thickness of 2 mm was subjected to sandblasting to roughen the entire surface of the aluminum plate. Zirconia beads (TZ-B125 manufactured by Tosoh Corporation and having an average particle size of 125 m) as first fine particles were blasted at a blasting pressure of 0.05 MPa (gauge pressure, the same applies hereinafter) and a fine particle usage amount of 16 g/cm$^2$ (amount used per 1 cm$^2$ of surface area of the roll, the same applies hereinafter) to form roughness on the surface of the aluminum plate. Using a blasting device (manufactured by Fuji Manufacturing Co., Ltd.), Zirconia beads (TZ-SX-17 manufactured by Tosoh Corporation and having an average particle size of 20 m) as second fine particles were blasted onto the rough surface at a blasting pressure of 0.1 MPa and with a fine particle usage amount of 4 g/cm$^2$ to fine-tune the roughness on the surface of the aluminum plate. The roughness of the surface of the aluminum plate was adjusted through multiple trial productions so that the haze of the cured coating film obtained by transfer as will be described later would be 70% or higher.

The above-described aluminum plate was placed on the dried uncured coating film of the antifouling layer forming ink with the blasted surface facing thereto. In this state, using a high-pressure mercury lamp (manufactured by EYE GRAPHICS COMPANY and with an illuminance of 20 mW/cm$^2$), the uncured coating film was irradiated with light from the PET side in a nitrogen atmosphere with an exposure of 300 mJ/cm$^2$ to cure the film. As a result, the roughness of the blasted surface was transferred to the surface of the cured coating film made of the antifouling layer forming ink. Further, corona treatment was applied to the exposed surface of PET to improve bondability.

An antifouling layer having a PET substrate and a surface layer made of the antifouling layer forming ink was thus obtained.

The dielectric constant εr of this antifouling layer at 10 GHz was 2.78, and the loss tangent tan δ was 0.0087 when measured in the above-described manner.

The antifouling layer had a haze of 72% and a cloudy appearance.

SEPTON 4044 (a random copolymer block of styrene-ethylene-ethylene-propylene-styrene (SEEPS) manufactured by Kuraray Co., Ltd.) was dissolved in toluene to a concentration of 25 wt %. This solution was applied to a release film with a knife coater and dried to form an adhesive layer with a thickness of 15 μm. The dielectric constant εr of the adhesive layer at 10 GHz was 2.2 and the loss tangent tan δ was 0.0013.

After attaching the adhesive layer with the release film to the PET surface of the antifouling layer, the release film was peeled off to provide the adhesive layer on the PET surface. The adhesive layer was brought into contact with the first surface of the copper-clad laminate to laminate the copper-clad laminate and the antifouling layer, and these two layers were bonded under the conditions of 160° C., 5 MPa, and 30 seconds.

In this way, the millimeter wave reflective decorative material according to Example II-A was obtained. The metal patterns of the supercells in this decorative material were difficult to see due to the cloudiness of the antifouling layer.

The total dielectric constant εr of the antifouling layer and adhesive layer of this decorative material together was 2.74 at 10 GHz, and the loss tangent tan δ was 0.0075.

Example II-B

An antifouling layer according to Example II-B was obtained in the same manner as in Example II-A, except that an antifouling layer forming ink b having the following composition was used in place of the antifouling layer forming ink a.

(Antifouling Layer Forming Ink b)
Pentaerythritol triacrylate: 60 parts by weight
Reaction product of hexamethylene diisocyanate and pentaerythritol triacrylate: 40 parts by weight
IRGACURE 369E: 0.2 parts by weight
Silicone-based material (GL-02R): 1 part by weight
Fluorine-based material (fluorine-based leveling agent RS-90 manufactured by DIC corporation): 1 part by weight
Styrenic fine particles (XX367K manufactured by Sekisui Chemical Co., Ltd.) 100 parts by weight
MIBK: 100 parts by weight
The dielectric constant εr of this antifouling layer according to Example II-B at 10 GHz was 2.78, and the loss tangent tan δ was 0.0087 when measured in the above-described manner.

The antifouling layer according to Example II-B had a cloudy appearance and a surface haze of 72%, which is equivalent to that of Example II-A.

Further, a millimeter wave reflective decorative material according to Example II-B was obtained in the same manner as in Example II-A. The total dielectric constant εr of the antifouling layer and adhesive layer of this decorative material together was 2.74 at 10 GHz, and the loss tangent tan δ was 0.0075.

Example II-C

An antifouling layer according to Example II-C was obtained in the same manner as in Example II-A, except that an antifouling layer forming ink c having the following composition was used in place of the antifouling layer forming ink a.

(Antifouling Layer Forming Ink b)
Pentaerythritol triacrylate: 60 parts by weight
Reaction product of hexamethylene diisocyanate and pentaerythritol triacrylate: 40 parts by weight
IRGACURE 369E: 0.2 parts by weight
Silicone-based material (silicone acrylic polymer 8SS-723 manufactured by Taisei Fine Chemical Co., Ltd.): 2 parts by weight
Styrenic fine particles (XX367K manufactured by Sekisui Chemical Co., Ltd.) 100 parts by weight
MIBK: 100 parts by weight
The dielectric constant εr of this antifouling layer according to Example IT-C at 10 GHz was 2.78, and the loss tangent tan δ was 0.0087 when measured in the above-described manner.

The antifouling layer according to Example II-C had a cloudy appearance and a surface haze of 72%, which is equivalent to that of Example II-A.

Further, a millimeter wave reflective decorative material according to Example II-C was obtained in the same manner as in Example II-A. The total dielectric constant εr of the antifouling layer and adhesive layer of this decorative material together was 2.74 at 10 GHz, and the loss tangent tan δ was 0.0075.

Example II-D

An antifouling layer forming ink a having the composition shown below was applied to a porous polypropylene film (New YUPO FGS manufactured by Yupo Corporation) with a thickness of 200 μm so that the film thickness after drying was 0.1 μm. The porous polypropylene film with the antifouling layer forming ink d applied thereon was dried in a drying oven at 80° C. for 1 minute.

(Antifouling Layer Forming Ink d)
Pentaerythritol triacrylate: 60 parts by weight
Reaction product of hexamethylene diisocyanate and pentaerythritol triacrylate: 40 parts by weight
IRGACURE 184: 0.1 parts by weight
Silicone-based material (GL-02R): 1 part by weight
MIBK: 900 parts by weight
Using a high-pressure mercury lamp (manufactured by EYE GRAPHICS COMPANY and with an illuminance of 20 mW/cm$^2$), the coating film was irradiated with light in a nitrogen atmosphere with an exposure of 300 mJ/cm$^2$ to cure the film. In this way, an antifouling layer according to Example II-D having a transparent thin surface layer on a cloudy substrate was obtained. The dielectric constant εr of this antifouling layer according to Example II-D at 10 GHz was 2.30, and the loss tangent tan δ was 0.0006 when measured in the above-described manner.

Further, a millimeter wave reflective decorative material according to Example II-D was obtained in the same manner as in Example II-A. The metal patterns of the supercells in this decorative material were difficult to see due to the substrate being white.

The total dielectric constant εr of the antifouling layer and adhesive layer of this decorative material together was 2.29 at 10 GHz, and the loss tangent tan δ was 0.0006.

Example II-E

An antifouling layer according to Example II-E was obtained in the same manner as in Example II-D, except that an antifouling layer forming ink e having the following composition was used in place of the antifouling layer forming ink d.

(Antifouling Layer Forming Ink e)
Pentaerythritol triacrylate: 60 parts by weight
Reaction product of hexamethylene diisocyanate and pentaerythritol triacrylate: 40 parts by weight
IRGACURE 184: 0.1 parts by weight
Silicone-based material (GL-02R): 0.5 part by weight
Fluorine-based material (RS-90): 0.5 part by weight
MIBK: 900 parts by weight
The dielectric constant εr of this antifouling layer according to Example II-E at 10 GHz was 2.30, and the loss tangent tan δ was 0.0006 when measured in the above-described manner.

Further, a millimeter wave reflective decorative material according to Example II-E was obtained in the same manner as in Example II-A. The total dielectric constant εr of the antifouling layer and adhesive layer of this decorative material together was 2.29 at 10 GHz, and the loss tangent tan δ was 0.0006.

Example II-F

An antifouling layer according to Example II-F was obtained in the same manner as in Example II-D, except that an antifouling layer forming ink f having the following composition was used in place of the antifouling layer forming ink d.

(Antifouling Layer Forming Ink f)
Pentaerythritol triacrylate: 60 parts by weight Reaction product of hexamethylene diisocyanate and pentaerythritol triacrylate: 40 parts by weight
IRGACURE 184: 0.1 parts by weight
Silicone-based material (8SS-723): 1 part by weight
MIBK: 900 parts by weight The dielectric constant $\varepsilon r$ of this antifouling layer according to Example II-F at 10 GHz was 2.30, and the loss tangent tan $\delta$ was 0.0006 when measured in the above-described manner.

Further, a millimeter wave reflective decorative material according to Example II-F was obtained in the same manner as in Example II-A. The total dielectric constant $\varepsilon r$ of the antifouling layer and adhesive layer of this decorative material together was 2.29 at 10 GHz, and the loss tangent tan $\delta$ was 0.0006.

Comparative Example II-A

An antifouling layer according to Comparative Example II-A was obtained in the same manner as in Example II-A, except that the surface layer made of the antifouling layer forming ink was not formed.

The total dielectric constant $\varepsilon r$ of the antifouling layer (only the substrate) and adhesive layer of this decorative material together was 2.29 at 10 GHz, and the loss tangent tan $\delta$ was 0.0006.

Comparative Example II-C

An insecticide containing a silicone antifouling agent (a jet spider web blocker manufactured by Earth Corporation) was sprayed for about 0.5 seconds onto the first surface of a copper-clad laminate provided with supercells but lacking the antifouling layer.

In this way, the millimeter wave reflective decorative material according to Comparative Example II-C was obtained.

The appearance, supercell protection performance, pure water contact angle, wipeability, and reflection characteristics of Examples II-A to II-F and Comparative Examples II-A to II-C were evaluated in the same manner as for Example II-1. Table 2 shows the evaluation results.

TABLE 2

|  | Ex. II-A | Ex. II-B | Ex. II-C | Ex. II-D | Ex. II-E | Ex. II-F | Comp. Ex. II-A | Comp. Ex. II-B | Comp. Ex. II-C |
|---|---|---|---|---|---|---|---|---|---|
| Appearance | Passed | Passed | Passed | Passed | Passed | Passed | Failed | Passed | Failed |
| Supercell protection performance | No rust or the like | No rust or the like | No rust or the like | No rust or the like | No rust or the like | No rust or the like | No rust or the like | No rust or the like | Rust was observed |
| Pure water contact angle | 93° | 96° | 102° | 94° | 95° | 101° | 74° | 75° | — |
| Wipeability | Grade 5 | Grade 5 | Grade 5 | Grade 5 | Grade 5 | Grade 5 | Grade 3 | Grade 3 | Grade 1 |
| Reflection characteristics (dBsm) | −1.7 dBsm | −1.6 dBsm | −1.6 dBsm | −1.1 dBsm | −1.1 dBsm | −1.2 dBsm | −1.6 dBsm | −1.1 dBsm | −0.4 dBsm |
| Reflectance (%) | 68% | 69% | 69% | 78% | 78% | 76% | 69% | 78% | 91% |

This antifouling layer is substantially made of only the substrate (A4360), and had a dielectric constant $\varepsilon r$ of 2.80 at 10 GHz and a loss tangent tan $\delta$ of 0.0080. The surface haze was 1.2%. Further, a millimeter wave reflective decorative material according to Comparative Example II-A was obtained in the same manner as in Example II-A. The metal patterns of the supercells in this decorative material could be easily seen due to the substrate being transparent.

The total dielectric constant $\varepsilon r$ of the antifouling layer (only the substrate) and adhesive layer of this decorative material together was 2.74 at 10 GHz, and the loss tangent tan $\delta$ was 0.0074.

Comparative Example II-B

An antifouling layer according to Comparative Example II-B was obtained in the same manner as in Example II-D, except that the surface layer made of the antifouling layer forming ink was not formed.

This antifouling layer is substantially made of only the substrate (New Yupo FGS) and had a dielectric constant $\varepsilon r$ of 2.30 at 10 GHz and a loss tangent tan $\delta$ of 0.0006.

Further, a millimeter wave reflective decorative material according to Comparative Example II-B was obtained in the same manner as in Example II-A. The metal patterns of the supercells in this decorative material were difficult to see due to the substrate being white.

All of Examples II-B to II-F had good appearance but not Comparative Examples II-A and II-C in which supercells were visible. All of Examples II-B to II-F and Comparative Examples II-A and II-B had good supercell protection performance but not Comparative Example IIC whose supercells were exposed.

For all of Examples II-A to II-F, the surface of the antifouling layer showed a pure water contact angle of 90° or more, and the contamination wipeability was also good.

Comparative Examples II-A and II-B do not have an antifouling layer, so the pure water contact angle was less than 90°, and the contamination wipeability was insufficient.

The pure water contact angle could not be measured for Comparative Example II-C since the surface of the dielectric was irregular. The wipeability was also not able to be evaluated because the contamination on the supercells and the dielectric could not be wiped off.

All of Examples II-A to II-F exhibited generally good reflection characteristics, although they were slightly lower than those of Example II-1 and the like.

Comparative Example II-C showed good reflection characteristics immediately after its fabrication. However, when these reflection characteristics of Comparative Example II-C were measured after evaluating the supercell protection performance, they were unmeasurable as the sample had lost the ability to reflect millimeter waves.

Next, the effect of suppressing spider nesting was evaluated as follows for a total of 11 examples: Examples II-A to II-F and Comparative Examples II-A to II-C plus Comparative Examples II-1 and II-3.

Four Joro spiders were released to nest under the eaves of a prefabricated building, and their webs were partially destroyed to an extent that the spiders would not escape. Then, the decorative material according to each example was installed slightly below the half-destroyed webs, with the antifouling layer facing the webs. The decorative materials were observed one week later to visually determine whether new scaffold threads had been attached to the decorative material.

This was performed twice for each example: once using the decorative material immediately after fabrication, and another time using the decorative material after vigorously wiping the antifouling layer (as for Comparative Example II-C, the first surface was sprayed with insecticide) 20 times with a nonwoven fabric impregnated with ethanol.

The results are shown in Table 3.

TABLE 3

|  | Ex. II-A | Ex. II-B | Ex. II-C | Ex. II-D | Ex. II-E | Ex. II-F | Comp. Ex. II-A | Comp. Ex. II-B | Comp. Ex. II-C | Comp. Ex. II-1 | Comp. Ex. II-3 |
|---|---|---|---|---|---|---|---|---|---|---|---|
| # of samples with threads (immediately after fabrication) | 0 | 0 | 0 | 0 | 0 | 0 | 4 | 4 | 4 | 4 | 0 |
| # of samples with threads (after wiping) | 0 | 0 | 0 | 0 | 0 | 0 | 4 | 4 | 4 | 4 | 4 |

As shown in Table 3, all of Examples II-A to II-F were able to completely prevent spiders from attaching new scaffold threads. This can be considered that because the antifouling layers of Examples II-A to II-F all contain a silicone material, the viscous liquid that is released from spiders and transforms into threads easily slips off, preventing the spiders from attaching scaffold threads.

The above-mentioned fluorine-based materials also have some nesting-preventing effect, but silicone-based materials are particularly suitable for this use as they are cheaper and have a better nesting-preventing effect.

Regarding Comparative Example II-3, when the decorative material immediately after fabrication was used, it could suppress the adhesion of threads, but this effect disappeared after the decorative material was wiped. This is likely to be because the sprayed insecticide was wiped off and its effect disappeared. Therefore, the method of spraying insecticide onto the surface of the decorative material had a concern that the nesting-preventing effect may weaken or disappear as time passes after the decorative material is installed or due to the decorative material being exposed to wind and rain.

On the other hand, no weakening of the effect caused by wiping the decorative material was seen with Examples II-A to II-F, and it can be expected that the nesting-prevention effect will continue for a long period of time even after the decorative materials are installed outdoors. It is also thought to have less negative impact on the ecosystem since nesting is prevented without the use of insecticidal ingredients and living organisms are not killed unnecessarily.

In addition to the nesting-preventing effect described above, the silicone-based material used in Examples II-A to II-F also have the following advantages.

In the case where the roughness is transferred to the surface of the antifouling layer to adjust the visibility of the underlying metal patterns as in Examples II-A to II-C, the mold can be released more easily when the coating film contains a silicone-based material. This improves the manufacturing efficiency.

Since silicone-based materials are cheaper than fluorine-based materials, they also have the advantage of greatly expanding the options for materials for different parts of the antifouling layer.

While an embodiment and examples of the present invention have been described, the specific configurations are not limited to the above embodiment. Various modifications and combinations of the configurations can be made without departing from the gist of the present invention. Some modifications will be shown below, but the modifications are not limited thereto and other modifications are also possible. These modifications can be combined as desired.

In the millimeter wave reflector (millimeter wave reflective decorative material) according to the present invention, the metal layer does not necessarily have to be provided on the second surface without any gaps. For example, the metal layer may be in the form of a mesh with small openings, or may have linear spaces corresponding to the sections of supercells. However, in areas where there is no metal layer, an incident millimeter wave is transmitted without being reflected, so if there are too many areas where there is no metal layer, the reflection performance may be affected. Therefore, it is preferable that the maximum continuous length of an area with no metal layer is smaller than $\frac{1}{4}\lambda$ of the frequency of the wave to be reflected. When the metal layer is in the form of a mesh, it is possible to transmit radio waves of predetermined wavelengths without reflecting them by adjusting the dimensions of the openings.

The decorative material may be configured such that an adhesive layer and a separator are provided on the metal layer, and the separator is peeled off to attach the decorative material directly to a wall surface or the like.

The arrangement of the supercells on the dielectric is not limited to the above-described arrangement and can be set as appropriate.

The adhesive layer is not essential in the present invention. For example, the antifouling layer may be fixed to the dielectric using screws or the like, or part of the dielectric or the antifouling layer may be melted and bonded using high frequency waves, ultrasonic waves, a laser, or the like. in the case an adhesive layer is provided, it is not limited to an ordinary adhesive, and methods such as thermal fusion using a hot melt adhesive or a heat seal layer can also be applied.

Third Embodiment

Figure 7:
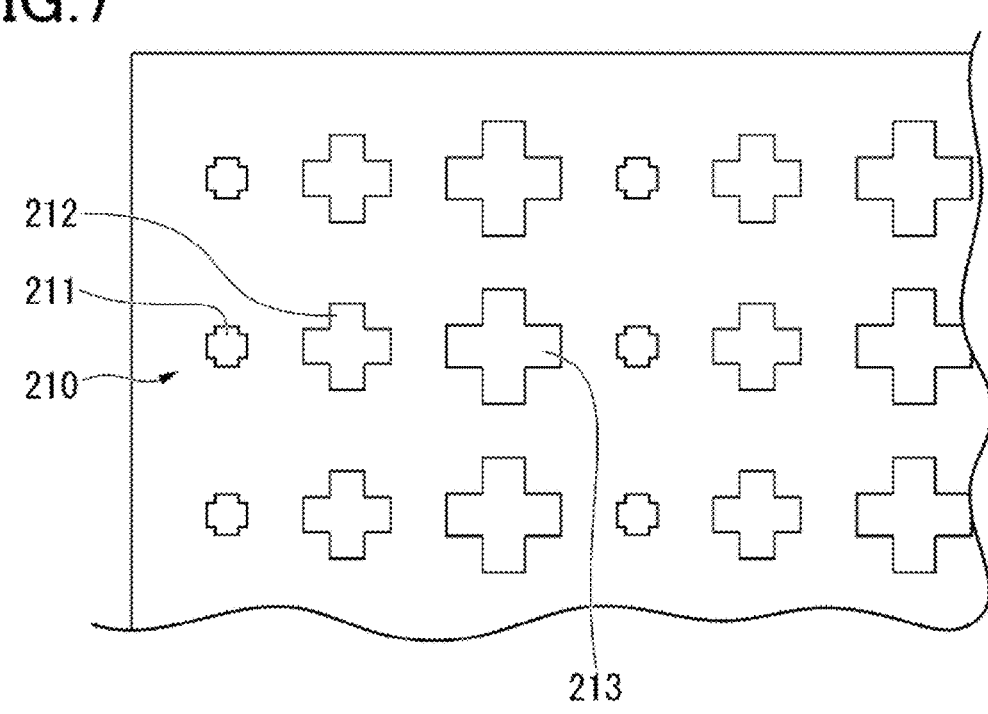
FIG. 7 is a partially enlarged plan view of the millimeter wave reflector.

Referring to FIGS. 6 and 7, a third embodiment of the present invention will be described FIG. 6 is a schematic cross-sectional view illustrating a millimeter wave reflector (millimeter wave reflective decorative material) 201 of the present embodiment. As shown in FIG. 6, the millimeter wave reflector 201 includes a planar dielectric 220, supercells 210 and a metal layer 230 provided on the dielectric 220, and an adhesive layer 240 and a fiber layer 250 covering the metal layer 230.

FIG. 7 shows a partially enlarged plan view of the millimeter wave reflector 201. A plurality of supercells 210 are provided on a first surface 220*a* of the dielectric 220 and have a plurality of metal patterns of different shapes.

In this embodiment, the supercells 210 have three cross-shaped metal patterns 211, 212, and 213 of different sizes. The metal patterns 211, 212, and 213 are arranged in one direction side by side. The shape, number, arrangement, and the like of the metal patterns are not limited to those shown in FIG. 7, and can be set as appropriate. They may have an annular shape or a three-dimensional shape like the mushroom structure described in PTL 1.

The plurality of supercells 210 are arranged in a two-dimensional matrix along the sides of the millimeter wave reflector 201, which is rectangular in plan view.

The material of the dielectric 220 is not particularly limited as long as it is a dielectric. Suitable examples of the dielectric 220 include glass cloth impregnated with synthetic resin, films made of various synthetic resins, and the like. Among these, dielectrics having low-loss electrical characteristics are more suitable, and examples include high-purity glass (quartz glass), fluororesin, liquid crystal polymers, polyphenylene ether, polyether ketone, and polyolefin. These may be used singly or by mixing or laminating a plurality of them.

The metal layer 230 is provided on a second surface 220*b* of the dielectric 220 opposite to the first surface 220*a*, and substantially covers the entire second surface 220*b*.

The dielectric 220, the supercells 210, and the metal layer 230 can be produced by, for example, using a material including a dielectric and metal foils bonded to both surfaces of the dielectric, and forming a plurality of supercells by patterning the metal foil by etching or the like.

In this embodiment, the supercells 210 and the metal layer 230 are made of copper. However, the materials of the supercells 210 and the metal layer 230 are not limited to copper, and they may be gold, silver, aluminum, or the like. The metal layer 230 in this embodiment only needs to have metal as its main component, and may also contain substances other than metal as long as it maintains conductivity of about 10–6 Ω·m or lower in terms of resistance. For example, silver-containing paste, copper-containing paste, and conductive metal oxides such as ITO can also be applied to the metal layer 230 depending on the purpose.

The adhesive layer 240 bonds the metal layer 230 and the fiber layer 250 together and also prevents the aqueous adhesive used for installation from coming into contact with the metal layer.

The material of the adhesive layer 240 is not particularly limited as long as it is an adhesive that can be bonded to the fiber layer 250 without deteriorating the metal layer 230, and examples thereof include urethane-based adhesives, acrylic adhesives, epoxy-based adhesives, silicone-based adhesives, urea resin-based adhesives, and phenol resin-based adhesives. These adhesives may be single-component adhesives or multi-component adhesives having two or more components.

The thickness of the adhesive layer 240 is preferably larger than a maximum height (Rz) of the surface roughness of the metal layer 230. This significantly reduces the risk of the metal layer 230 breaking through the adhesive layer 240, and advantageously prevents the part of the metal layer 230 that has broken through the adhesive layer 240 from coming into contact with the aqueous adhesive that has penetrated into the fiber layer 250.

The maximum height Rz of the surface of the metal layer 230 can be obtained based on the surface measurement according to JIS B0601.

The fiber layer 250 is formed by intertwining a large number of fibrous materials. Examples of the fiber layer 250 include various papers including plain paper, and non-woven fabric. It is particularly preferable to use a material that has good bondability to both the adhesive layer 240 and the aqueous adhesive used for installation. The thickness of the fiber layer 250 is not particularly limited as long as it has good bondability. The fibrous materials forming the fiber layer 250 may be either natural fiber or synthetic fiber.

The operations of the millimeter wave reflector 201 of the present embodiment during use, which is configured as described above, will now be explained.

When attaching the millimeter wave reflector to a construction material such as a plasterboard, an aqueous adhesive is applied to the construction material, and then the fiber layer 250 side of the millimeter wave reflector 201 is brought close to the surface coated with the aqueous adhesive and bonded together. After preserving the millimeter wave reflector 201, aqueous adhesive, and construction material in this state for a certain period of time (for example, 10 days), the installation of the millimeter wave reflector 201 is completed.

Since the aqueous adhesive used for installation has good bondability with the fiber layer 250, the millimeter wave reflector 201 is reliably bonded to the target construction material. Part of the aqueous adhesive permeates the fiber layer 250 and reaches the adhesive layer 240 side. However, since the metal layer 230 is covered with the adhesive layer 240, contact between the aqueous adhesive and the metal layer 230 is suppressed, and corrosion and the like caused by this contact are advantageously prevented. Since the thickness of the adhesive layer 240 is larger than the maximum height Rz of the surface of the metal layer 230, the risk of the metal layer 230 locally breaking through the adhesive layer 240 can be almost completely eliminated, which further enhances this effect.

When millimeter waves are incident on the millimeter wave reflector 201, part of the millimeter waves are reflected by the supercells 210, and the other part passes through the dielectric 220 and is reflected by the metal layer 230. The incident millimeter waves are emitted from the millimeter wave reflector 201 as reflected waves in accordance with reflection characteristics set by the phase difference between these reflected waves and the metal patterns of the supercells 210.

If necessary, a wallpaper or the like may be attached to the millimeter wave reflector 201 to obscure the supercells 210, thereby achieving both desired appearance and reflection characteristics.

Since the millimeter wave reflector 201 of this embodiment can be easily attached to construction materials using an aqueous adhesive, desired millimeter wave reflection characteristics can be imparted to buildings without reducing the efficiency of installation work. In addition, the metal layer 230 is not damaged by the aqueous adhesive.

The material of the adhesive layer 240 bonds the metal layer 230 and the fiber layer 250 together and prevents the aqueous adhesive used for installation from coming into contact with the metal layer includes a solvent-based adhesive. However, the adhesive layer 240 is not applied at the installation site, and most of the solvent present during the formation of the adhesive layer 240 evaporates over time after manufacturing the millimeter wave reflector 201, during the preservation phase, or the like. Therefore, there is almost no concern about sick building syndrome caused by the adhesive layer 240.

The millimeter wave reflective decorative material according to the present embodiment will be further described by using examples and comparative examples. The technical idea according to the present invention is not limited in any way by the specific contents of the examples and comparative examples.

Example III-1

A 60 mm×60 mm copper-clad laminate (CGP-500 manufactured by Chukoh Chemical Industries, Ltd.) including a dielectric and copper foils on both sides thereof was prepared. The dielectric is a fluororesin-impregnated glass cloth (thickness: 764 μm). The two copper foils both have a thickness of 18 μm, and the total thickness is 0.8 mm.

One side of the copper-clad laminate was etched to form a plurality of supercells arranged in a two-dimensional matrix. The supercells include three cruciform metal patterns. The small pattern had a width of 1.1 mm, and vertical and horizontal dimensions of 1.4 mm. The medium pattern had a width of 1.4 mm, and vertical and horizontal dimensions of 3.0 mm. The large pattern had a width of 1.4 mm, and vertical and horizontal dimensions of 3.7 mm. The three patterns were arranged in the order of small, medium, and large at equal intervals within a 5 mm×15 mm section, and this was used as a supercell unit. This supercell is designed to reflect vertically incident 28 GHz band millimeter waves at an angle of 45° in the direction from the small pattern toward the large pattern.

The supercells having the above configuration were formed into a two-dimensional matrix of 12 rows and 4 columns. After forming the supercells, the supercells were impregnated with a benzotriazole-based rust inhibitor. The supercells were treated to prevent rust by washing them with tap water after that.

The other surface was used as a metal layer without being etched, and its surface roughness was measured.

The measurements were conducted in accordance with JIS B 0601 using a non-contact surface/layer cross-sectional shape measurement system (VertScan R550GML manufactured by Mitsubishi Chemical Corporation (formerly known as Ryoka Systems Inc.)) in the following environment.

CCD camera: SONY HR-50 1/3'
Objective lens: 10×
Lens tube: 0.5× Body
Zoom lens: No Relay
Wavelength filter: 530 white
Measurement mode: Wave A 640 μm×480 μm area of the metal layer was randomly selected for measurement, and the arithmetic mean roughness (Ra) and root mean square roughness (Rq) were measured at 12 points using the outputs from fourth-order polynomial correction. The surface roughness was determined by averaging the values at 10 points excluding the maximum and minimum values.

As a result, the arithmetic mean roughness Ra of the metal layer was 0.43 μm, and the maximum height Rz was 1.6 μm.

A coating solution for the adhesive layer obtained by mixing a urethane-based two-component adhesive (Takelac A310, manufactured by Mitsui Chemicals, Inc.), a curing agent (Takenate A10, manufactured by Mitsui Chemicals, Inc.), and a solvent (ethyl acetate) in a ratio of 12:1:21 was applied onto the metal layer 230. The metal layer 230 coated with the coating solution for the adhesive layer was dried at 100° C. for 10 seconds to form the adhesive layer 240 having a film thickness of 4 μm after being dried.

A 130 μm thick sheet of plain paper (WK685AP manufactured by KJ SPECIALTY PAPER Co., Ltd.) was bonded onto the adhesive layer 240 to form the fiber layer 250.

Then, aging was performed at 40° C. for 4 days to obtain a millimeter wave reflector according to Example III-1.

Example III-2

A millimeter wave reflector according to Example III-2 was obtained in the same manner as in Example III-1 except that the thickness of the adhesive layer 240 was 2 μm.

Example III-3

A millimeter wave reflector according to Example III-3 was obtained in the same manner as in Example III-1 except that the thickness of the adhesive layer 240 was 6 μm.

Example III-4

A millimeter wave reflector according to Example III-4 was obtained in the same manner as in Example III-1 except that the thickness of the adhesive layer 240 was 1 μm.

Comparative Example III-1

A millimeter wave reflector according to Comparative Example III-1 was obtained in the same manner as in Example III-1 except that the adhesive layer 240 and the fiber layer 250 were not provided.

The millimeter-wave reflectors of these examples were evaluated as follows.

(Evaluation of Bondability to Construction Materials)

A 65 mm×65 mm×12.5 mm semi-non-combustible plasterboard (Tiger Hi-Clean Board manufactured by Yoshino Gypsum Co., Ltd.) was prepared as the construction material.

An aqueous adhesive (138N manufactured by Japan Coating Resin Corporation and having a pH of 4 to 6) was applied to the plasterboard with a coating weight of 100 g/m², and the metal layer 230 side of the example was bonded thereto. The millimeter wave reflector bonded with the plasterboard was allowed to stand for 10 days to obtain a construction material with the millimeter wave reflector of the example.

In each of the construction materials provided with the millimeter wave reflector according to the examples, two 65 mm incisions were made that penetrate the millimeter wave reflector in the thickness direction and have a gap of 25 mm therebetween. The part of the millimeter wave reflector between the incisions was pulled in the normal direction to peel it off from the plasterboard.

The samples in which cohesive failure had occurred in the fiber layer 250 or the plasterboard layer were rated as passed (good), and those in which peeling occurred at the interface between the millimeter wave reflector and the plasterboard were rated as failed (poor).

(Reflection Characteristics Evaluation)

For each of the examples, the construction material with the millimeter wave reflector according to the example was attached to a flat wooden board so that the plasterboard is in contact with the wooden board, and the assembly was fixed in an anechoic chamber environment.

Transmitted waves from a horn antenna were reflected by a curved reflector to generate 28 GHz plane waves and perpendicularly irradiate the decorative material with the plane waves.

The reflected wave from the decorative material was measured using a receiving antenna installed in a far-field position relative to the decorative material. This receiving antenna was installed on the robot and is configured to orbit while maintaining a constant far-field distance from the decorative material (that is, to orbit while maintaining a constant distance between the receiving antenna and the decorative material) so that the reflected waves could be measured over a wide angular range. In this evaluation, the RCS (radar cross section) in a direction of 45° to the normal, which is the design content, was used as the evaluation value.

(Evaluation of Moist Heat Resistance)

The decorative material of each example was left to stand in a high temperature and humidity chamber at 40° C. and 90% RH (relative humidity) for 1000 hours. The decorative material of each example was taken out from the high temperature and humidity chamber after being left to stand, and left to stand for 24 hours in an environment of 23° C. and 50% RH for drying. The above-described reflection characteristics of the example decorative materials were evaluated after that.

Table 4 shows the results.

TABLE 4

| | | Ex. III-1 | Ex. III-2 | Ex. III-3 | Ex. III-4 | Comp. Ex. III-1 |
|---|---|---|---|---|---|---|
| Bondability | | Good | Good | Good | Good | Poor |
| Reflection characteristics (dBsm) | Immediately after fabrication | −0.30 | −0.30 | −0.30 | −0.30 | −0.30 |
| | After applying moist heat load | −0.30 | −0.31 | −0.29 | −1.42 | N/A |

All of Examples III-1 to III-4 could be firmly bonded to the construction material using the aqueous adhesive. On the other hand, Comparative Example III-1, which did not include the adhesive layer 240 and the fiber layer 250, could be easily peeled off from the construction material and could not be bonded strongly enough by the aqueous adhesive.

All of Examples III-1 to III-4 and Comparative Example III-1 exhibited good reflection characteristics based on the supercell settings immediately after fabrication. As for Example III-4, the reflection characteristics slightly deteriorated after being subjected to a moist heat load, but the reflection characteristics were 72% of the designed value, which falls within a practical range.

On the other hand, the reflective characteristics of Comparative Example III-1 disappeared after being subjected to a moist heat load. This was considered to be due to significant deterioration of the metal layer caused by its contact with the aqueous adhesive.

While an embodiment and examples of the present invention have been described, the specific configurations are not limited to the above embodiment. Various modifications and combinations of the configurations can be made without departing from the gist of the present invention. Some modifications will be shown below, but the modifications are not limited thereto and other modifications are also possible. These modifications can be combined as desired.

In the millimeter wave reflector (millimeter wave reflective decorative material) according to the present invention, the metal layer does not necessarily have to be provided on the second surface without any gaps. For example, the metal layer may be in the form of a mesh with small openings, or may have linear spaces corresponding to the sections of supercells. However, in areas where there is no metal layer, an incident millimeter wave is transmitted without being reflected, so if there are too many areas where there is no metal layer, the reflection performance may be affected. Therefore, it is preferable that the maximum continuous length of an area with no metal layer is smaller than $\frac{1}{4}\lambda$ of the frequency of the wave to be reflected. When the metal layer is in the form of a mesh, it is possible to transmit radio waves of predetermined wavelengths without reflecting them by adjusting the dimensions of the openings.

Another configuration of the millimeter wave reflector according to the present invention includes an adhesive layer and a separator on the metal layer. In this case as well, by making the thickness of the adhesive layer larger than the maximum height Rz of the surface roughness of the metal layer, the metal layer can be bonded to the construction material while protecting the metal layer from the aqueous adhesive.

In this case, the steps of the installation method for attaching the millimeter wave reflector to the construction material are as shown in a to c below.

a. Apply an aqueous adhesive to the construction material.

b. Attach the fiber layer to the aqueous adhesive.

c. Peel off the separator from the millimeter wave reflector and bond it to the fiber layer bonded to the construction material.

The aqueous adhesive may be one or a combination of two or more of vinyl acetate, ethylene vinyl acetate, acrylic and other emulsions, water-soluble synthetic resin pastes such as polyvinyl alcohol and cellulose-based paste, natural vegetable pastes such as starch, and the like.

The arrangement of the supercells on the dielectric is not limited to the above-described arrangement and can be set as appropriate.

Fourth Embodiment

Figure 8:
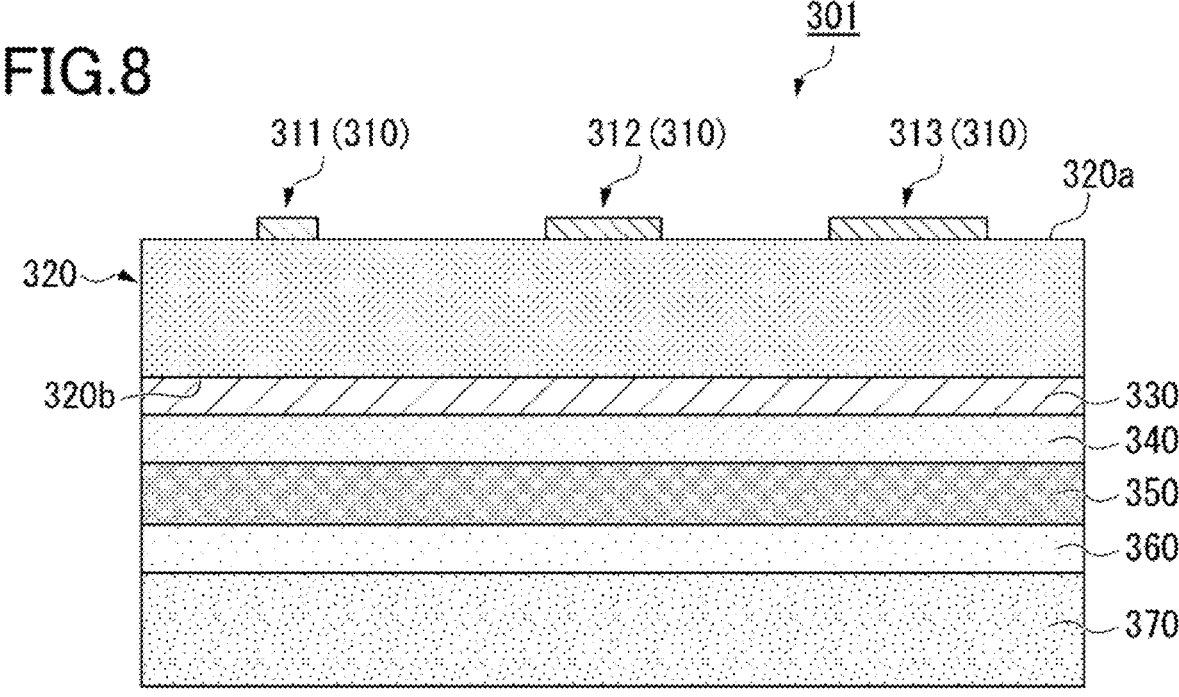
FIG. 8 is a schematic cross-sectional view of a millimeter wave reflector (millimeter wave reflective decorative material) according to a fourth embodiment of the present invention.
Figure 9:
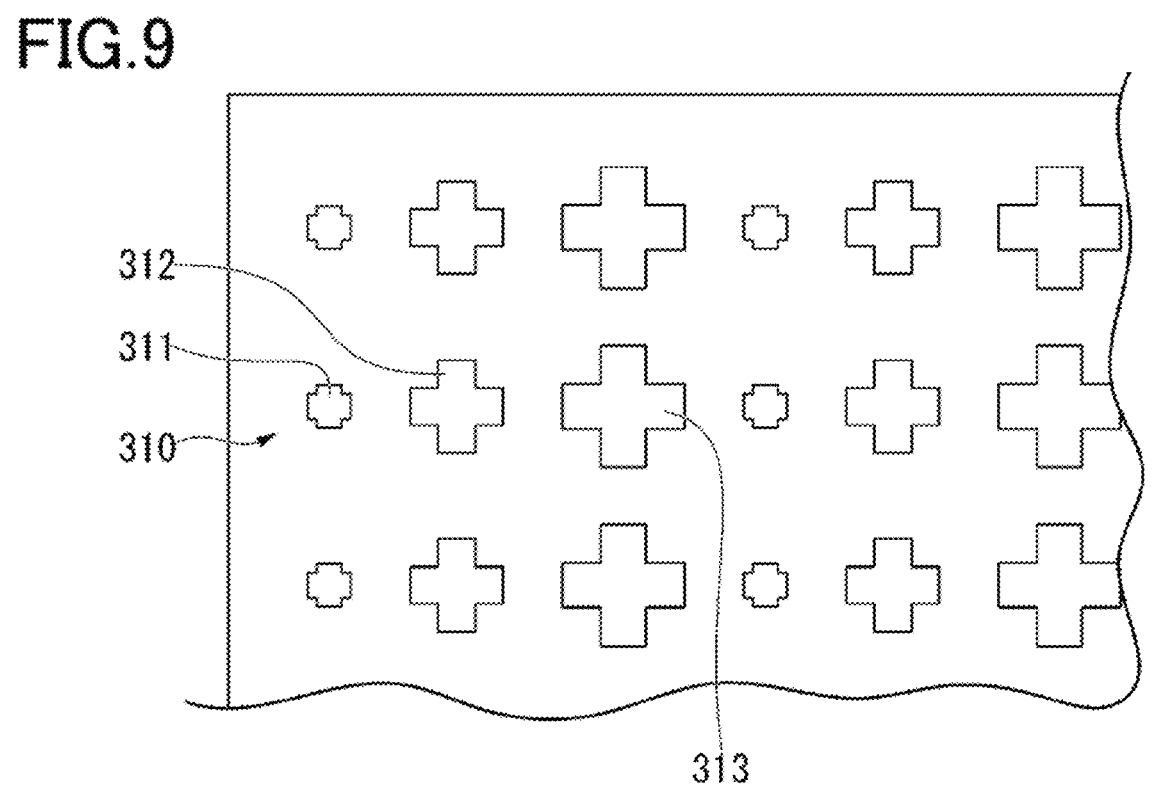

Referring to FIGS. 8 and 9, a fourth embodiment of the present invention will be described.

FIG. 8 is a schematic cross-sectional view illustrating a millimeter wave reflector (millimeter wave reflective decorative material) 301 of the present embodiment. As shown in FIG. 8, the millimeter wave reflector 301 includes a planar dielectric 320; supercells 310 and a metal layer 330 provided on the dielectric 320; and a first adhesive layer 340, a water vapor barrier layer 350, a second adhesive layer 360, and a fiber layer 370 covering the metal layer 330.

FIG. 9 shows a partially enlarged plan view of the millimeter wave reflector 301. A plurality of supercells 310 are provided on a first surface 320a of the dielectric 320 and have a plurality of metal patterns of different shapes.

In this embodiment, the supercells 310 have three cross-shaped metal patterns 311, 312, and 313 of different sizes. The metal patterns 311, 312, and 313 are arranged in one direction side by side. The shape, number, arrangement, and the like of the metal patterns are not limited to those shown in FIG. 9, and can be set as appropriate. They may have an annular shape or a three-dimensional shape like the mushroom structure described in PTL 1.

The plurality of supercells 310 are arranged in a two-dimensional matrix along the sides of the millimeter wave reflector 301, which is rectangular in plan view.

The material of the dielectric 320 is not particularly limited as long as it is a dielectric. Suitable examples of the dielectric 320 include glass cloth impregnated with synthetic resin, films made of various synthetic resins, and the like. Among these, dielectrics having low-loss electrical characteristics are more suitable, and examples include high-purity glass (quartz glass), fluororesin, liquid crystal polymers, polyphenylene ether, polyether ketone, and polyolefin. These may be used singly or by mixing or laminating a plurality of them.

The metal layer 330 is provided on a second surface 320b of the dielectric 320 opposite to the first surface 320a, and substantially covers the entire second surface 320b.

The dielectric 320, the supercells 310, and the metal layer 330 can be produced by, for example, using a material including a dielectric and metal foils bonded to both surfaces of the dielectric, and forming a plurality of supercells by patterning the metal foil by etching or the like.

In this embodiment, the supercells 310 and the metal layer 330 are made of copper. However, the materials of the supercells 310 and the metal layer 330 are not limited to copper, and they may be gold, silver, aluminum, or the like. The metal layer 330 in this embodiment only needs to have metal as its main component, and may also contain substances other than metal as long as it maintains conductivity of about $10^{-6}$ Ω·m or lower in terms of resistance. For example, silver-containing paste, copper-containing paste, and conductive metal oxides such as ITO can also be applied to the metal layer 330 depending on the purpose.

The first adhesive layer 340 bonds the metal layer 330 and the water vapor barrier layer 350.

The material of the first adhesive layer 340 is not particularly limited as long as it is an adhesive that can be bonded to the water vapor barrier layer 350 without deteriorating the metal layer 330, and examples thereof include urethane-based adhesives, acrylic adhesives, epoxy-based adhesives, silicone-based adhesives, urea resin-based adhesives, and phenol resin-based adhesives. These adhesives may be single-component adhesives or multi-component adhesives having two or more components.

The thickness of the first adhesive layer 340 is not particularly limited but may be smaller than the maximum height (Rz) of the surface roughness of the metal layer 330. In this case, part of the metal layer 330 may break through the first adhesive layer 340, but if the part of the metal layer 330 breaking through the first adhesive layer 340 does not break through the water vapor barrier layer 350 and the second adhesive layer 360, the metal layer 330 will not come into contact with the aqueous adhesive that has penetrated the fiber layer 370.

The maximum height Rz of the surface of the metal layer 330 can be obtained based on the surface measurement according to JIS B 0601.

The water vapor barrier layer 350 has low water vapor permeability and suppresses water vapor from reaching the metal layer 330 from the fiber layer 370 side.

In this embodiment, since the metal layer 330 is covered by the first adhesive layer 340, the water vapor permeability of the water vapor barrier layer 350 does not need to be as high as that of a general water vapor barrier film. An example of such a water vapor permeability is 50 g/m²/24 h or less. Therefore, a film that can achieve this water vapor permeability with an appropriate thickness of about 10 to 50 μm can be used. For example, a single layer film of polyethylene terephthalate (PET) with a water vapor permeability of about 45 g/m²/24 h, polypropylene (PP) with a water vapor permeability of about 10 g/m²/24 h, or the like can be used as the water vapor barrier layer 350 as is.

Other examples of the configuration of the water vapor barrier layer 350 include a single layer or laminated film of synthetic resin, metal foil such as aluminum foil, and a barrier film having a barrier layer containing metal or metal oxide.

The second adhesive layer 360 bonds the water vapor barrier layer 350 and the fiber layer 370.

The material of the second adhesive layer 360 may be the same as or different from that of the first adhesive layer 340.

The fiber layer 370 is formed by intertwining a large number of fibrous materials. Examples of the fiber layer 370 include various papers including plain paper, and nonwoven fabric. It is particularly preferable to use a material that has good bondability to both the second adhesive layer 360 and the aqueous adhesive used for installation. The thickness of the fiber layer 370 is not particularly limited as long as it has good bondability. The fibrous materials forming the fiber layer 370 may be either natural fiber or synthetic fiber.

The operations of the millimeter wave reflector 301 of the present embodiment during use, which is configured as described above, will now be explained.

When attaching the millimeter wave reflector to a construction material such as a plasterboard, an aqueous adhesive is applied to the construction material, and then the fiber layer 370 side of the millimeter wave reflector 301 is brought close to the surface coated with the aqueous adhesive and bonded together. After preserving the millimeter wave reflector 301, aqueous adhesive, and construction material in this state for a certain period of time (for example, 10 days), the installation of the millimeter wave reflector 301 is completed.

Since the aqueous adhesive used for installation has good bondability with the fiber layer 370, the millimeter wave reflector is reliably bonded to the target construction material. Part of the aqueous adhesive permeates the fiber layer 370 and reaches the second adhesive layer 360 side. However, since the metal layer 330 is covered with the first adhesive layer 340, contact between the aqueous adhesive and the metal layer 330 is suppressed, and corrosion and the like caused by this contact are advantageously prevented. Further, even if the water contained in the aqueous adhesive becomes water vapor and passes through the second adhesive layer 360, this water vapor is prevented from reaching the first adhesive layer 340 by being blocked by the water vapor barrier layer 350. This also contributes to suppressing the occurrence of corrosion or the like of the metal layer 330.

When millimeter waves are incident on the millimeter wave reflector 301, part of the millimeter waves is reflected by the supercells 310, and the other part passes through the dielectric 320 and is reflected by the metal layer 330. The incident millimeter waves are emitted from the millimeter wave reflector 301 as reflected waves in accordance with reflection characteristics set by the phase difference between these reflected waves and the metal patterns of the supercells 310.

If necessary, a wallpaper or the like may be attached to the millimeter wave reflector 301 to obscure the supercells 310, thereby achieving both desired appearance and reflection characteristics.

Since the millimeter wave reflector 301 of this embodiment can be easily attached to construction materials using an aqueous adhesive, desired millimeter wave reflection characteristics can be imparted to buildings without reducing the efficiency of installation work. In addition, the metal layer 330 is not damaged by the aqueous adhesive.

The materials of the first and second adhesive layers 340 and 360 include solvent-based adhesives. However, these adhesive layers 340 and 360 are not applied at the installation site, and most of the solvent present during the formation of the adhesive layers 340 and 360 evaporates over time after manufacturing the millimeter wave reflector 301, during the preservation phase, or the like. Therefore, there is almost no concern about sick building syndrome caused by these adhesive layers 340 and 360.

The millimeter wave reflective decorative material according to the present embodiment will be further described by using examples and comparative examples. The technical idea according to the present invention is not limited in any way by the specific contents of the examples and comparative examples.

Example IV-1

A 60 mm×60 mm copper-clad laminate (CGP-500 manufactured by Chukoh Chemical Industries, Ltd.) including a dielectric and copper foils on both sides thereof was prepared. The dielectric is a fluororesin-impregnated glass cloth (thickness: 764 μm). The two copper foils both have a thickness of 18 μm, and the total thickness is 0.8 mm.

One side of the copper-clad laminate was etched to form a plurality of supercells arranged in a two-dimensional matrix. The supercells include three cruciform metal patterns. The small pattern had a width of 1.1 mm, and vertical and horizontal dimensions of 1.4 mm. The medium pattern had a width of 1.4 mm, and vertical and horizontal dimensions of 3.0 mm. The large pattern had a width of 1.4 mm, and vertical and horizontal dimensions of 3.7 mm. The three patterns were arranged in the order of small, medium, and large at equal intervals within a 5 mm×15 mm section, and this was used as a supercell unit. This supercell is designed to reflect vertically incident 28 GHz band millimeter waves at an angle of 45° in the direction from the small pattern toward the large pattern.

The supercells having the above configuration were formed into a two-dimensional matrix of 12 rows and 4 columns. After forming the supercells, the supercells were impregnated with a benzotriazole-based rust inhibitor. The supercells were treated to prevent rust by washing them with tap water after that.

The other surface was used as a metal layer without being etched, and its surface roughness was measured.

The measurements were conducted in accordance with JIS B 0601 using a non-contact surface/layer cross-sectional shape measurement system (VertScan R550GML manufactured by Mitsubishi Chemical Corporation (formerly known as Ryoka Systems Inc.)) in the following environment.

CCD camera: SONY HR-50 1/3'
Objective lens: 10×
Lens tube: 0.5× Body
Zoom lens: No Relay
Wavelength filter: 530 white
Measurement mode: Wave A 640 μm×480 μm area of the metal layer was randomly selected for measurement, and the arithmetic mean roughness (Ra) and root mean square roughness (Rq) were measured at 12 points using the outputs from fourth-order polynomial correction. The surface roughness was determined by averaging the values at 10 points excluding the maximum and minimum values.

As a result, the arithmetic mean roughness Ra of the metal layer was 0.43 μm, and the maximum height Rz was 1.6 μm.

A coating solution for the adhesive layer obtained by mixing a urethane-based two-component adhesive (Takelac A310, manufactured by Mitsui Chemicals, Inc.), a curing agent (Takenate A10, manufactured by Mitsui Chemicals, Inc.), and a solvent (ethyl acetate) in a ratio of 12:1:21 was applied onto the metal layer 330. The coating solution for the adhesive layer on the metal layer 330 was dried at 100° C. for 10 seconds to form a first adhesive layer 340 having a film thickness of 0.9 μm after being dried.

A 12 μm thick PET film (Lumirror T60 manufactured by Toray Industries, Inc.) was laminated onto the first adhesive layer 340 to form the water vapor barrier layer 350. The water vapor permeability of this PET film was 45 g/m²/24 h when measured in accordance with JIS K 7129 (40° C. and 90% RH).

Further, the coating solution for adhesive layer was applied onto the water vapor barrier layer and dried at 100° C. for 10 seconds to form a second adhesive layer 360 with a film thickness of 0.5 μm after being dried. A 130 μm thick sheet of plain paper (WK685AP manufactured by KJ SPECIALTY PAPER Co., Ltd.) was bonded onto the second adhesive layer 360 to form the fiber layer 370.

Then, aging was performed at 40° C. for 4 days to obtain a millimeter wave reflector according to Example IV-1.

Example IV-2

A millimeter wave reflector according to Example IV-2 was obtained in the same manner as in Example IV-1 except that the thickness of the first adhesive layer 340 was 4 am.

Example IV-3

A millimeter wave reflector according to Example IV-3 was obtained in the same manner as in Example IV-1, except that a stretched polypropylene film with a thickness of 20 m (ME-1 manufactured by Mitsui Chemicals Tohcello Inc.) was used as the water vapor barrier layer 350. The water vapor permeability of this polypropylene film was 10 g/m²/24 h when measured in accordance with JIS K 7129 (40° C. and 90% RH).

Example IV-4

A millimeter wave reflector according to Example IV-4 was obtained in the same manner as in Example IV-3 except that the thickness of the first adhesive layer 340 was 4 μm.

Example IV-5

A millimeter wave reflector according to Example IV-5 was obtained in the same manner as in Example IV-1, except that a barrier film with a thickness of 12 μm (GL-AE manufactured by TOPPAN Holdings Inc.) was used as the water vapor barrier layer 350. This barrier film has a configuration in which a barrier layer of an inorganic oxide is provided on a base material made of PET, and its water vapor permeability is 0.6 g/m²/24 h when measured in accordance with JIS K 7129 (40° C. and 90% RH).

Example IV-6

A millimeter wave reflector according to Example IV-6 was obtained in the same manner as in Example IV-5 except that the thickness of the first adhesive layer 340 was 4 μm.

Example IV-7

A millimeter wave reflector according to Example IV-7 was obtained in the same manner as in Example IV-1, except that an aluminum foil with a thickness of 9 μm (8079 manufactured by Toyo Aluminum K.K.) was used as the water vapor barrier layer 350. The water vapor permeability of this aluminum foil was 0.1 g/m²/24 h when measured in accordance with JIS K 7129 (40° C. and 90% RH).

Example IV-8

A millimeter wave reflector according to Example IV-8 was obtained in the same manner as in Example IV-7 except that the thickness of the first adhesive layer 340 was 4 μm.

Comparative Example IV-1

A millimeter wave reflector according to Comparative Example IV-1 was obtained in the same manner as in Example IV-1 except that the water vapor barrier layer 350 and the second adhesive layer 360 were not provided, and the fiber layer 370 was bonded to the first adhesive layer 340.

Comparative Example IV-2

A millimeter wave reflector according to Comparative Example IV-2 was obtained in the same manner as in Example IV-1 except that the first adhesive layer 340, the water vapor barrier layer 350, the second adhesive layer 360, and the fiber layer 370 were not provided.

The millimeter-wave reflectors of these examples were evaluated as follows.

(Evaluation of Bondability to Construction Materials)

A 65 mm×65 mm×12.5 mm semi-non-combustible plasterboard (Tiger Hi-Clean Board manufactured by Yoshino Gypsum Co., Ltd.) was prepared as the construction material.

An aqueous adhesive (138N manufactured by Japan Coating Resin Corporation and having a pH of 4 to 6) was applied to the plasterboard with a coating weight of 100 g/m², and the metal layer 330 side of the example was bonded thereto. The millimeter wave reflector bonded with the plasterboard was allowed to stand for 10 days to obtain a construction material with the millimeter wave reflector of the example.

In each of the construction materials provided with the millimeter wave reflector according to the examples, two 65 mm incisions were made that penetrate the millimeter wave reflector in the thickness direction and have a gap of 25 mm therebetween. The part of the millimeter wave reflector between the incisions was pulled in the normal direction to peel it off from the plasterboard.

The samples in which cohesive failure had occurred in the fiber layer 370 or the plasterboard layer were rated as passed (good), and those in which peeling occurred at the interface between the millimeter wave reflector and the plasterboard were rated as failed (poor).

(Reflection Characteristics Evaluation)

For each of the examples, the construction material with the millimeter wave reflector according to the example was attached to a flat wooden board so that the plasterboard is in contact with the wooden board, and the assembly was fixed in an anechoic chamber environment.

Transmitted waves from a horn antenna were reflected by a curved reflector to generate 28 GHz plane waves and perpendicularly irradiate the decorative material with the plane waves.

The reflected wave from the decorative material was measured using a receiving antenna installed in a far-field position relative to the decorative material. This receiving antenna was installed on the robot and is configured to orbit while maintaining a constant far-field distance from the decorative material (that is, to orbit while maintaining a constant distance between the receiving antenna and the decorative material) so that the reflected waves could be measured over a wide angular range. In this evaluation, the RCS (radar cross section) in a direction of 45° to the normal, which is the design content, was used as the evaluation value.

(Evaluation of Moist Heat Resistance)

The decorative material of each example was left to stand in a high temperature and humidity chamber at 40° C. and 90% RH (relative humidity) for 1000 hours. The decorative material of each example was taken out from the high temperature and humidity chamber after being left to stand, and left to stand for 24 hours in an environment of 23° C. and 50% RH for drying. After that, the above-described reflection characteristics of each decorative material were evaluated.

Regarding Comparative Example IV-2, this evaluation was omitted because it was clear that the reflection characteristics would deteriorate significantly due to deterioration of the metal layer.

The results are shown in Table 5.

TABLE 5

| | | Ex. IV-1 | Ex. IV-2 | Ex. IV-3 | Ex. IV-4 | Ex. IV-5 | Ex IV-6 | Ex. IV-7 | Ex. IV-8 | Comp. Ex. IV-1 | Comp. Ex. IV-2 |
|---|---|---|---|---|---|---|---|---|---|---|---|
| Bondability | | Good | Good | Good | Good | Good | Good | Good | Good | Good | Poor |
| Reflection characteristics (dBsm) | Immediately after fabrication | −0.30 | −0.30 | −0.29 | −0.30 | −0.30 | −0.30 | −0.30 | −0.30 | −0.30 | −0.30 |
| | After applying moist heat load | −0.30 | −0.30 | −0.29 | −0.29 | −0.30 | −0.30 | −0.30 | −0.30 | −2.90 | — |

All of Examples IV-1 to IV-8 and Comparative Example IV-1 could be firmly bonded to the construction material using the aqueous adhesive. On the other hand, Comparative Example IV-2 in which the metal layer is not covered and is exposed could be easily peeled off from the construction material and could not be bonded strong enough by the aqueous adhesive.

All of Examples IV-1 to IV-8 and Comparative Example IV-1 and IV-2 exhibited good reflection characteristics based on the supercell settings immediately after fabrication. However, the reflective characteristics of Comparative Example IV-1 deteriorated significantly after being subjected to a moist heat load. This is considered to be because the adhesive layer was too thin and part of the metal layer broke through the adhesive layer, and since there was no water vapor barrier layer or second adhesive layer, the metal layer came into contact with the aqueous adhesive and deteriorated.

Examples IV-1 to IV-8 have the water vapor barrier layer and the second adhesive layer. Therefore, it was inferred that even if the thickness of the first adhesive layer is smaller than the maximum height Rz of the metal layer, the samples still had good reflection characteristics after being subjected to a moist heat load, and the metal layer was suitably protected.

While an embodiment and examples of the present invention have been described, the specific configurations are not limited to the above embodiment. Various modifications and combinations of the configurations can be made without departing from the gist of the present invention. Some modifications will be shown below, but the modifications are not limited thereto and other modifications are also possible. These modifications can be combined as desired.

In the millimeter wave reflector (millimeter wave reflective decorative material) according to the present invention, the metal layer does not necessarily have to be provided on the second surface without any gaps. For example, the metal layer may be in the form of a mesh with small openings, or may have linear spaces corresponding to the sections of supercells. However, in areas where there is no metal layer, an incident millimeter wave is transmitted without being reflected, so if there are too many areas where there is no metal layer, the reflection performance may be affected. Therefore, it is preferable that the maximum continuous length of an area with no metal layer is smaller than $\frac{1}{4}\lambda$ of the frequency of the wave to be reflected. When the metal layer is in the form of a mesh, it is possible to transmit radio waves of predetermined wavelengths without reflecting them by adjusting the dimensions of the openings.

In another configuration of the millimeter wave reflector according to the present invention, the second adhesive layer is formed of a material that is not cured, and the second adhesive layer is covered with a separator. The metal layer can be easily bonded to the construction material and can be protected from the aqueous adhesive in this case as well.

In this case, the steps of the installation method for attaching the millimeter wave reflector to the construction material are as shown in a to c below.

a. Apply an aqueous adhesive to the construction material.

b. Attach the fiber layer to the aqueous adhesive.

c. Peel off the separator from the millimeter wave reflector and bond the second adhesive layer to the fiber layer bonded to the construction material.

The aqueous adhesive may be one or a combination of two or more of vinyl acetate, ethylene vinyl acetate, acrylic and other emulsions, water-soluble synthetic resin pastes such as polyvinyl alcohol and cellulose-based paste, natural vegetable pastes such as starch, and the like.

The arrangement of the supercells on the dielectric is not limited to the above-described arrangement and can be set as appropriate.

INDUSTRIAL APPLICABILITY

The millimeter wave reflective decorative material according to the present invention has good appearance and reflection characteristics. The millimeter wave reflective decorative material according to the present invention has good antifouling properties, and can maintain good reflection characteristics for a long period of time even when installed outdoors. Further, the millimeter wave reflector according to the present invention functions well even when installed with an aqueous adhesive.

[Reference Signs List] 1 . . . Millimeter wave reflective decorative material; 10 . . . Supercell; 11, 12, 13 . . . Metal pattern; 20 . . . Dielectric; 20a . . . First surface; 20b . . . Second surface; 30 . . . Metal layer; 40 . . . Adhesive layer; 50 . . . Protective layer; 101, 101A . . . Millimeter wave reflective decorative material; 110 . . . Supercell; 111, 112, 113 . . . Metal pattern; 120 . . . Dielectric; 120a . . . First surface; 120b . . . Second surface; 130 . . . Metal layer; 140 . . . Adhesive layer; 150, 150A . . . Antifouling layer; 151 . . . Substrate; 152 . . . Surface layer; 201 . . . Millimeter wave reflector (millimeter waver reflective decorative material); 210 . . . Supercell; 211, 212, 213 . . . Metal pattern; 220 . . . Dielectric; 220a . . . First surface; 220b . . . Second surface; 230 . . . Metal layer; 240 . . . Adhesive layer; 250 . . . Fiber layer; 301 . . . Millimeter wave reflector (millimeter wave reflective decorative material); 310 . . . Supercell; 311, 312, 313 . . . Metal pattern; 320 . . . Dielectric; 320a . . . First surface; 320b . . . Second surface; 330 . . . Metal layer; 340 . . . First adhesive layer; 350 . . . Water vapor barrier layer; 360 . . . Second adhesive layer; 370 . . . Fiber layer.

What is claimed is:

1. A millimeter wave reflective decorative material, comprising:

a planar dielectric;

a supercell provided on a first surface of the dielectric and having a plurality of metal patterns of different shapes;

a metal layer provided on a second surface of the dielectric opposite to the first surface, and a protective layer containing an olefin-based material as a main component and covering the supercell, wherein the protective layer obscures the supercell in plan view.

2. The millimeter wave reflective decorative material of claim 1, further comprising an adhesive layer located between the dielectric and the protective layer and between the supercell and the protective layer.

3. The millimeter wave reflective decorative material of claim 1, wherein the olefin-based material has a dielectric constant Er of 2.7 or less.

4. The millimeter wave reflective decorative material of claim 1, wherein the protective layer has a porous structure.

5. The millimeter wave reflective decorative material of claim 1, further comprising an antifouling layer covering the supercell and having a surface with a pure water contact angle of 90° or more, wherein the antifouling layer has a dielectric constant er of 2.9 or less, and the antifouling layer obscures the supercell in plan view.

6. The millimeter wave reflective decorative material of claim 5, further comprising an adhesive layer located between the dielectric and the antifouling layer and between the supercell and the antifouling layer.

7. The millimeter wave reflective decorative material of claim 5, wherein the antifouling layer contains a fluorine-based material or a silicone-based material.

8. The millimeter wave reflective decorative material of claim 5, wherein the antifouling layer includes a substrate having a surface with a pure water contact angle of less than 90°, and a surface layer provided on the substrate and having a surface with a pure water contact angle of 90° or more.

9. A millimeter wave reflective decorative material, comprising:

a planar dielectric;

a supercell provided on a first surface of the dielectric and having a plurality of metal patterns of different shapes;

a metal layer provided on a second surface of the dielectric opposite to the first surface, and an antifouling layer covering the supercell and having a surface with a pure water contact angle of 90° or more, wherein the antifouling layer has a dielectric constant er of 2.9 or less, and the antifouling layer obscures the supercell in plan view.

10. The millimeter wave reflective decorative material of claim 9, further comprising an adhesive layer located between the dielectric and the antifouling layer and between the supercell and the antifouling layer.

11. The millimeter wave reflective decorative material of claim 9, wherein the antifouling layer contains a fluorine-based material or a silicone-based material.

12. The millimeter wave reflective decorative material of claim 9, wherein the antifouling layer includes a substrate having a surface with a pure water contact angle of less than 90°, and a surface layer provided on the substrate and having a surface with a pure water contact angle of 90° or more.

* * * * *